(12) United States Patent
Tashiro

(10) Patent No.: US 7,880,976 B2
(45) Date of Patent: Feb. 1, 2011

(54) ZOOM LENS SYSTEM AND CAMERA INCLUDING THE SAME

(75) Inventor: Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 12/476,589

(22) Filed: Jun. 2, 2009

(65) Prior Publication Data

US 2009/0296233 A1 Dec. 3, 2009

(30) Foreign Application Priority Data

Jun. 3, 2008 (JP) .............................. 2008-145622

(51) Int. Cl.
G02B 15/14 (2006.01)
(52) U.S. Cl. ...................................... 359/691; 359/676
(58) Field of Classification Search .................. 359/691, 359/676, 680–682
See application file for complete search history.

(56) References Cited

U.S. PATENT DOCUMENTS 7,382,551 B2 * 6/2008 Sekita ......................... 359/686

2001/0030812 A1 * 10/2001 Furuta ......................... 359/680

FOREIGN PATENT DOCUMENTS

| JP | 06-273670 A | 9/1994 |
|----|----|----|
| JP | 11-052235 A | 2/1999 |
| JP | 2002-372667 A | 12/2002 |
| JP | 2004-061519 A | 2/2004 |
| JP | 2004-325975 A | 11/2004 |
| JP | 2006-084886 A | 3/2006 |

* cited by examiner

*Primary Examiner*—Joseph Martinez
*Assistant Examiner*—James R Greece
(74) *Attorney, Agent, or Firm*—Canon U.S.A., Inc. I.P. Division

(57) ABSTRACT

Disclosed is a zoom lens system in which a first lens unit having negative optical power and a second lens unit having positive optical power are arranged in the stated order from an object side to an image side, and in which an interval between the first lens unit and the second lens unit changes in zooming. In such a zoom lens system, the first lens unit includes a first lens component having negative optical power, a second lens component joined to a lens surface of the first lens component, and a third lens component having positive optical power so as to provide the zoom lens system having excellent optical performance by appropriately setting a material forming the first lens component.

8 Claims, 17 Drawing Sheets

ZOOM LENS SYSTEM AND CAMERA INCLUDING THE SAME

BACKGROUND OF THE INVENTION

1. Field of the Invention

The present invention relates to a zoom lens system and a camera including the same.

2. Description of the Related Art

In recent years, a camera such as a video camera, a digital still camera, or a silver-halide film using a solid state image pickup element is demanded to have high function and high performance and be small in overall size.

A photographing optical system used in the camera is demanded to be a zoom lens system that has a wide angle of field and high optical performance and is small in overall size.

Further, the photographing optical system is demanded to be a retractable zoom lens system including a configuration for reducing intervals among lens units during non-photographing to intervals different from those in a photographing state and reducing a thickness (length in an optical axis direction) of the entire camera.

Moreover, in a camera employing a solid state image pickup element, various optical members such as a low-pass filter and a color correction filter are arranged between a lens end and the image pickup element. Therefore, when the photographing optical system is used in such a camera, the photographing optical system is requested to be a zoom lens system having long back focus.

Conventionally, as a zoom lens system having a wide angle of field and long back focus, there is known a negative-lead zoom lens system including, in the stated order from an object side to an image side, a lens unit having negative refractive power and a lens unit having positive refractive power (Japanese Patent Application Laid-Open No. H11-52235 (corresponding to U.S. Pat. No. 6,081,389) and Japanese Patent Application Laid-Open No. H06-273670).

As a zoom lens system easily reduced in retractable part and having long back focus, there is known a three-group zoom lens system including, in the stated order from an object side to an image side, a first lens unit having negative refractive power, a second lens unit having positive refractive power, and a third lens unit having positive refractive power (Japanese Patent Application Laid-Open No. 2002-372667 and Japanese Patent Application Laid-Open No. 2004-325975 (corresponding to U.S. Pat. No. 7,050,242)).

Further, there is known a zoom lens system, the entire thickness of which is reduced by using a translucent ceramic material having a higher refractive index than an optical glass (Japanese Patent Application Laid-Open No. 2006-84886 (corresponding to U.S. Pat. No. 7,286,297)).

There is known a zoom lens system having high optical performance with chromatic aberration satisfactorily corrected by using a complex optical element formed by stacking a resin layer on a lens surface of a lens made of a glass material (Japanese Patent Application Laid-Open No. 2004-61519 (corresponding to U.S. Pat. No. 7,027,379)).

In the negative-lead zoom lens system in which the lens unit having negative refractive power is provided closer to the object side, it is easy to increase an angle of field and secure long back focus.

However, in the negative-lead zoom lens system, because the entire lens system is asymmetrical, aberrations, in particular, lateral chromatic aberration often occur.

Further, in the retractable zoom lens system, it is easy to retract the entire system when the zoom lens system is not used and reduce the size of the zoom lens system. However, when the number of lenses of lens units configuring the zoom lens system is large, the length on an optical axis of the lens units increases and, though the zoom lens system is retractable, a retractable part is long.

Therefore, in the retractable zoom lens system, it is important to reduce the number of lenses of the lens units.

In the negative-lead zoom lens system, when it is attempted to reduce the number of lenses of the lens units and reduce the retractable part, aberrations related to imaging performance in a single color such as spherical aberration and coma aberration often occur. It is difficult to correct the aberrations.

In order to obtain high optical performance in the negative-lead zoom lens, it is important to select a lens configuration of the first lens unit having negative refractive power, in particular, a material appropriate for the lenses configuring the first lens unit.

Further, in order to reduce the size of the entire system, it is important to configure the first lens unit, which has an increasing effective diameter, with a small number of lenses.

If the lens configuration of the first lens unit is inappropriate, it is difficult to obtain high optical performance in an entire zoom range at a wide angle of field while realizing a reduction in size of the entire system.

SUMMARY OF THE INVENTION

It is an object of the present invention to provide a zoom lens system having excellent optical performance with aberrations such as chromatic aberration satisfactorily corrected at a wide angle of field and a high zoom ratio.

In an exemplary zoom lens system according to the present invention, a first lens unit having negative optical power and a second lens unit having positive optical power are arranged in the stated order from an object side to an image side. In zooming, an interval between the first lens unit and the second lens unit changes. In such a zoom lens system, the first lens unit includes a first lens component having negative optical power, a second lens component joined to a lens surface of the first lens component, and a third lens component having positive optical power. A surface on the image side of the second lens component is formed in an aspherical shape.

When a refractive index with respect to a d-line of a material of the first lens component and an Abbe number thereof are represented as $Nd1n$ and $vd1n$, respectively, the following condition is satisfied.

$$2.45 < Nd1n - (9.3 \times 10^{-5} \times vd1n^2 - 1.7 \times 10^{-2} \times vd1n) < 3.00$$

$$5.0 < vd1n < 80.0$$

Further features of the present invention will become apparent from the following description of exemplary embodiments with reference to the attached drawings.

DESCRIPTION OF THE PREFERRED EMBODIMENTS

Figure 1:
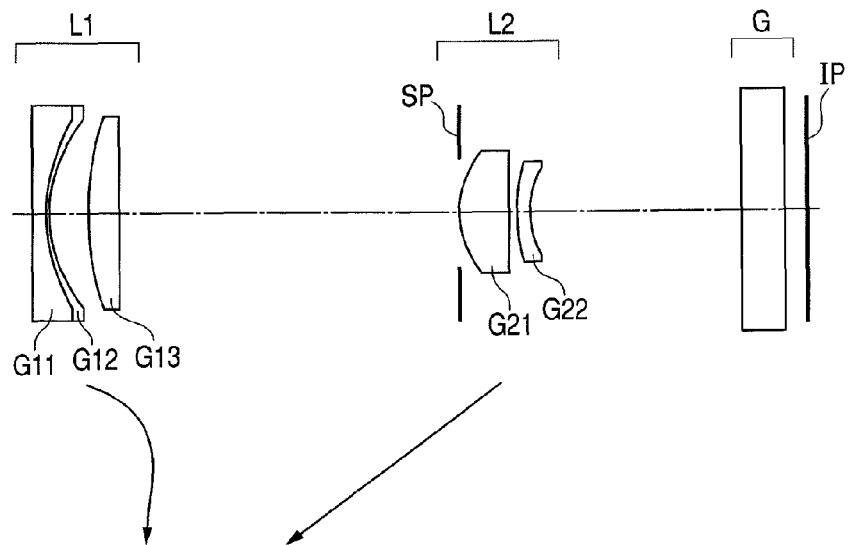
FIG. 1 is a sectional view of lenses according to a first embodiment of the present invention.

Hereinafter, embodiments of a zoom lens system according to the present invention and a camera including the same are described.

The zoom lens system according to this embodiment includes a first lens unit having negative refractive power and a second lens unit having positive refractive power in the stated order from an object side (magnification side or magnification conjugate side) to an image side (reduction side or reduction conjugate side). Further, the zoom lens system may include at least one lens unit on the image side of the second lens unit.

In the zoom lens system according to this embodiment, when zooming is performed, at least two lens units are moved so that an interval between adjacent lens units is changed.

The first lens unit includes a first lens component having negative refractive power, a second lens component (having finite focal length, i.e., refractive power) joined to the first lens component, and a third lens component having positive refractive power. In the first lens unit, the first lens component, the second lens component, and the third lens component are arranged from the object side to the image side (in the stated order from the object side). The first lens component is a lens component having negative refractive power made of, for example, a ceramic material. The second lens component is made of a material (e.g., resin) different from the material of the first lens component and joined to (stacked on) a surface on the image side of the first lens component. In other words, the first lens component (base material) and the second lens component configure a complex optical element. Further, the third lens component is arranged separately (is a separate member) from the first and second lens components and has positive refractive power. A surface on the image side of the second lens component is formed in an aspherical shape. Order of arrangement of the first, second, and third lens components may be any order. However, when the second lens component has an aspherical surface, it is desirable to provide the aspherical surface of the second lens component on a surface different from the joining surface with the first lens component (surface on the opposite side of first lens component). Further, the second lens component desirably has negative refractive power. However, refractive power of the second lens component is not limited to the negative refractive power. The second lens component may have positive refractive power.

The thickness on an optical axis of the first lens component is three times or more (preferably five times or more) as large as the thickness on the optical axis of the second lens component. The thickness on the optical axis of the first lens component is preferably 100 times or less as large as the thickness on the optical axis of the second lens component.

Further, an absolute value of the refractive power (inverse of the focal length) of the first lens component is twice or more (preferably, 2.5 times or more) as large as an absolute value of the refractive power of the second lens component. The absolute value of the refractive power (inverse of the focal length) of the first lens component is 50 times or less (preferably 40 times or less) as large as the absolute value of the refractive power of the second lens component.

Here, the lens component means an optical element that is obtained by forming a resin or the like thin on a lens or a lens surface of the lens to have refractive power in the optical element as a whole. A material of the first lens component having negative refractive power in a first lens unit L1 satisfies conditional expressions (1) and (2) described later. The first lens unit L1 only has to have at least one negative lens (negative lens component) made of the material satisfying the conditional expressions (1) and (2) and may have multiple negative lenses.

Figure 2:
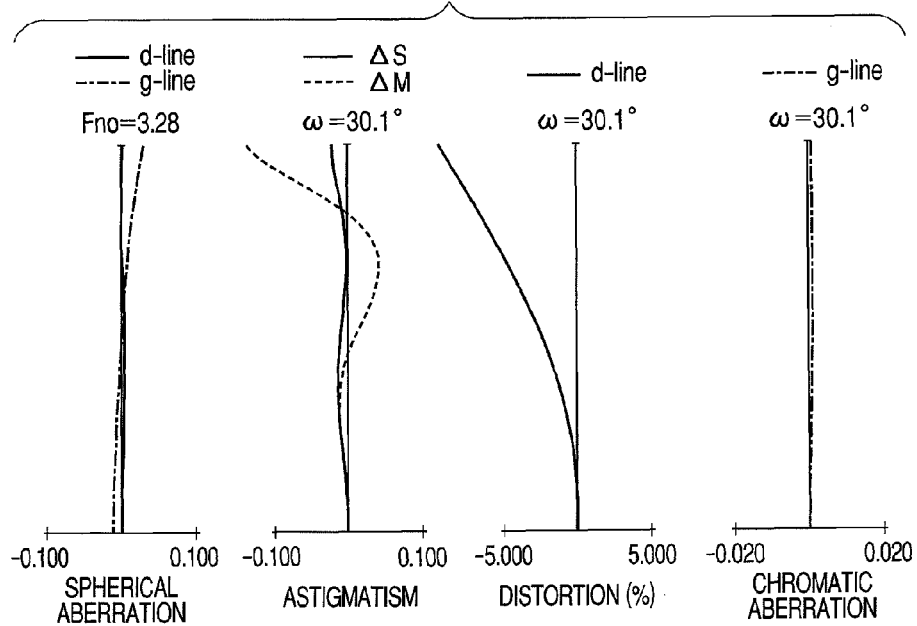
FIG. 2 is an aberration diagram at a wide angle end in the first embodiment.
Figure 3:
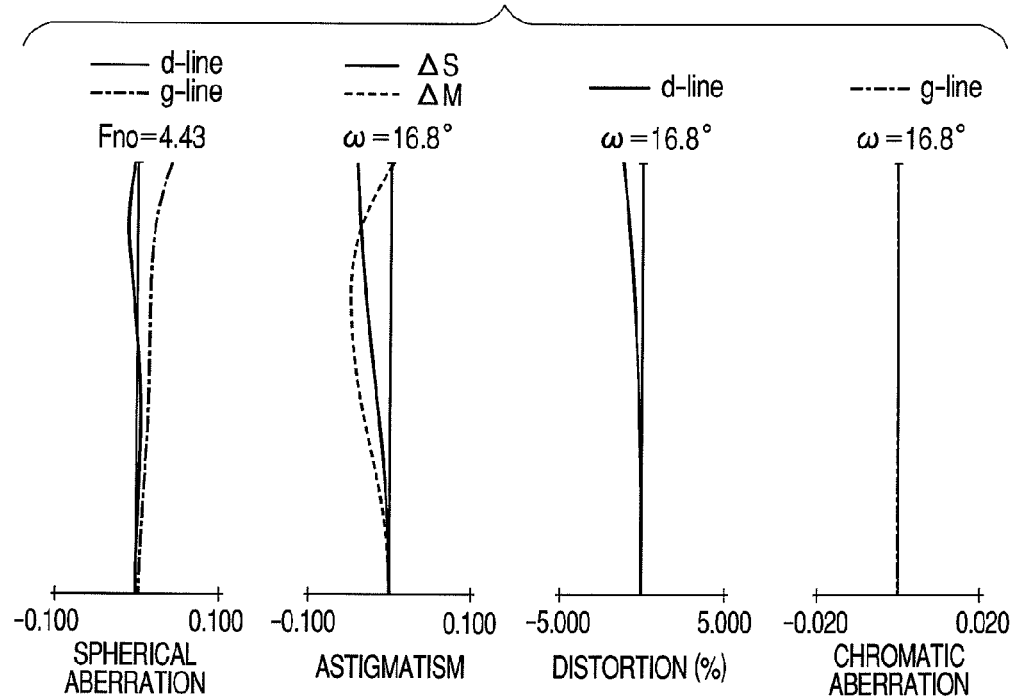
FIG. 3 is an aberration diagram in an intermediate zoom position in the first embodiment.
Figure 4:
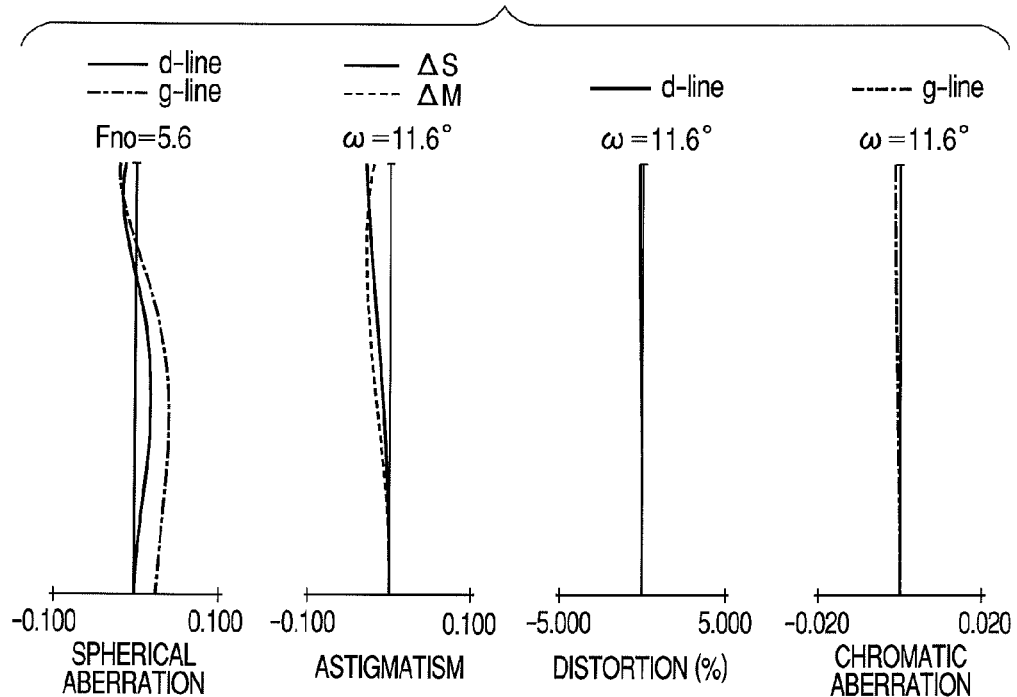
FIG. 4 is an aberration diagram at a telephoto end in the first embodiment.

FIG. 1 is a sectional view at a wide angle end (short focal length end) of a zoom lens system according to a first embodiment of the present invention. FIGS. 2 to 4 are aberration diagrams at the wide angle end, in an intermediate zoom position, and at a telephoto end (long focal length end) in the first embodiment, respectively. The zoom lens system according to the first embodiment is a zoom lens system in which a zoom ratio is 3 and an aperture ratio is about 3.3 to 5.6.

Figure 5:
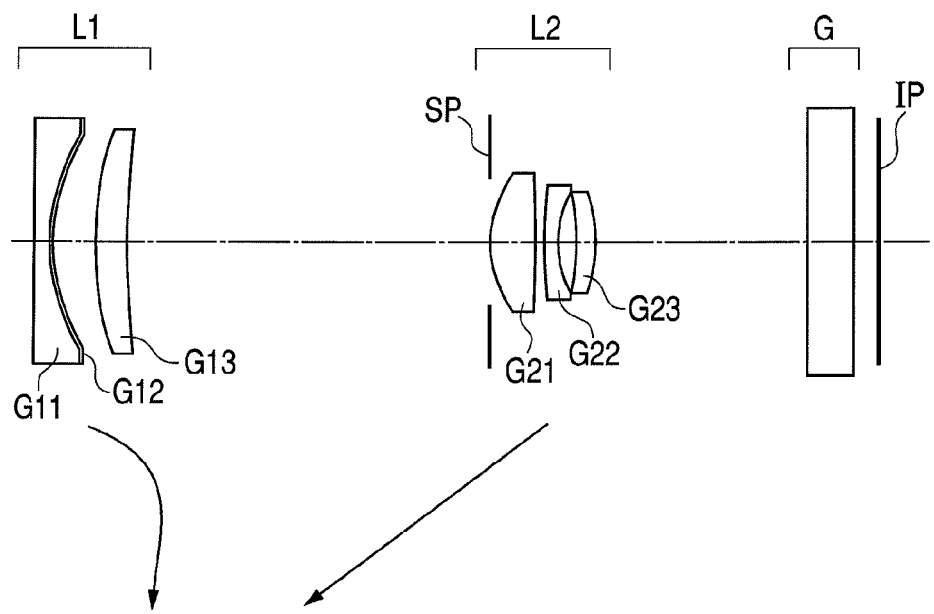
FIG. 5 is a sectional view of lenses according to a second embodiment of the present invention.
Figure 6:
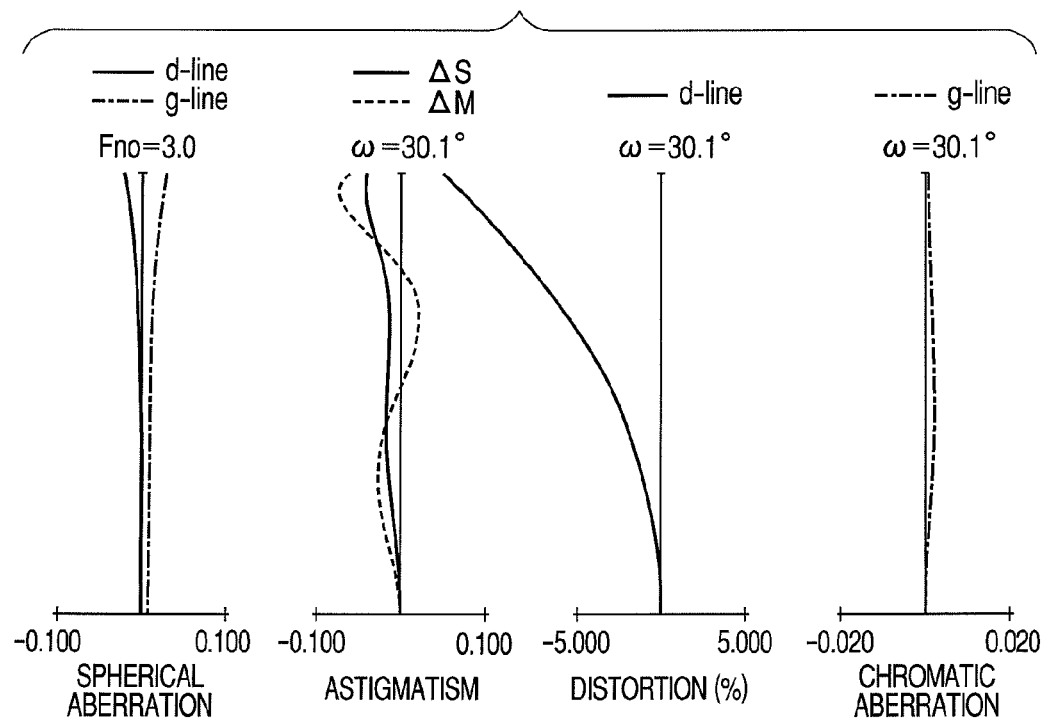
FIG. 6 is an aberration diagram at a wide angle end in the second embodiment.
Figure 7:
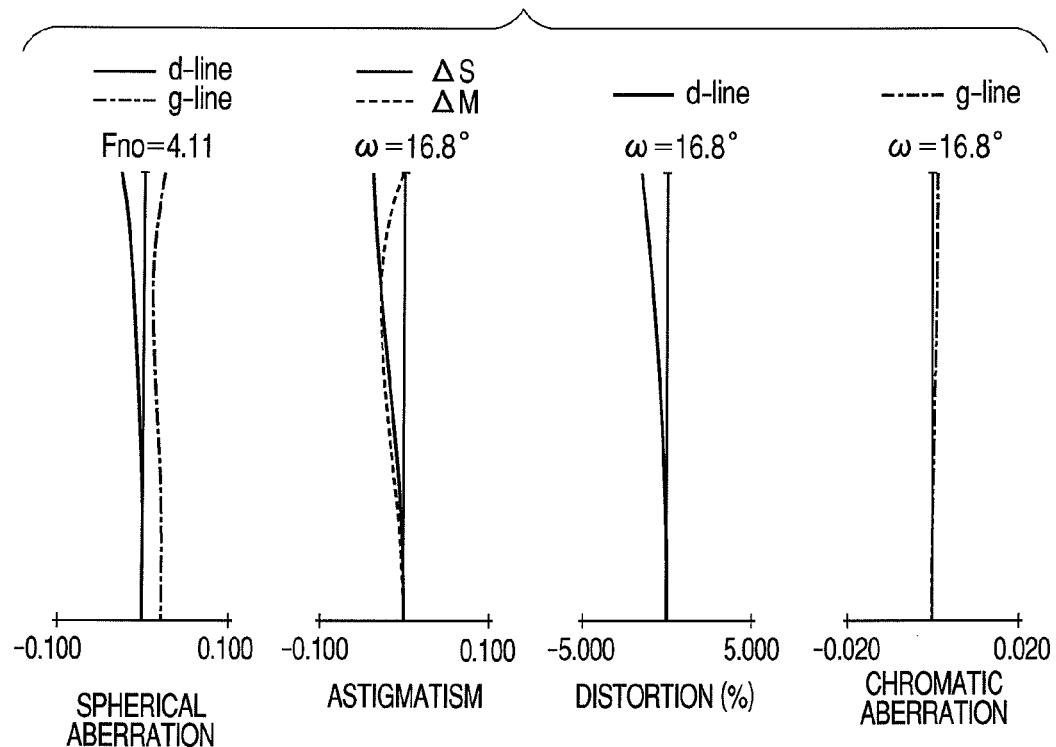
FIG. 7 is an aberration diagram in an intermediate zoom position in the second embodiment.
Figure 8:
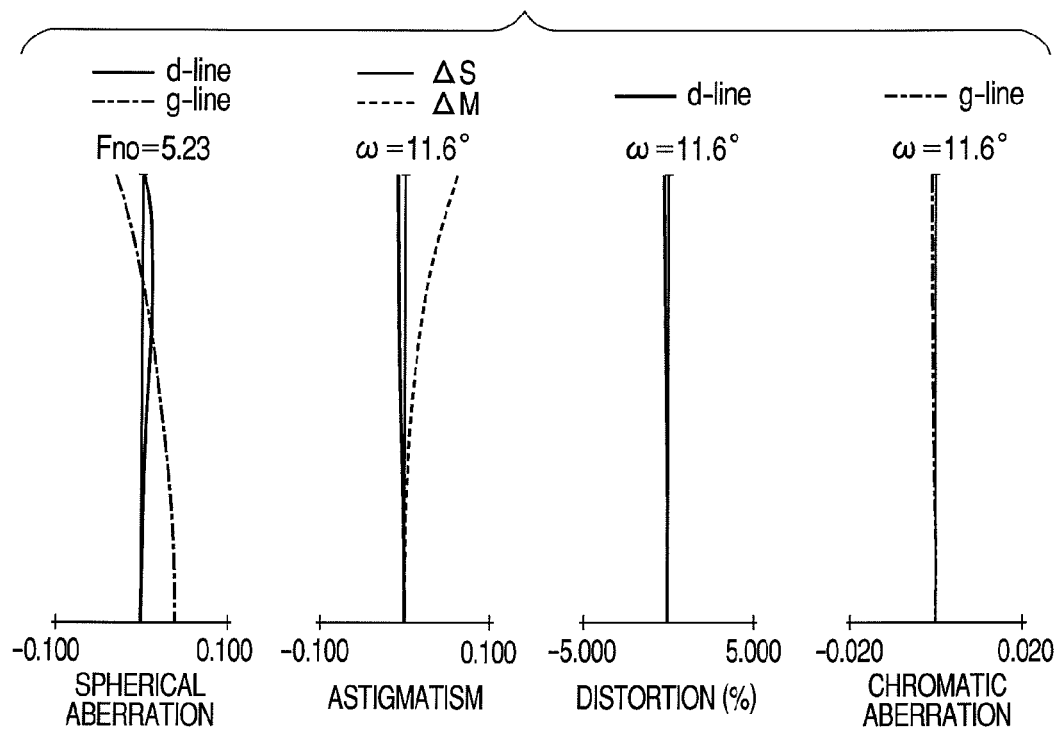
FIG. 8 is an aberration diagram at a telephoto end in the second embodiment.

FIG. 5 is a sectional view at a wide angle end of a zoom lens system according to a second embodiment of the present invention. FIGS. 6 to 8 are aberration diagrams at the wide angle end, in an intermediate zoom position, and at a telephoto end in the second embodiment, respectively. The zoom lens system according to the second embodiment is a zoom lens system in which a zoom ratio is 3 and an aperture ratio is about 3.0 to 5.2.

Figure 9:
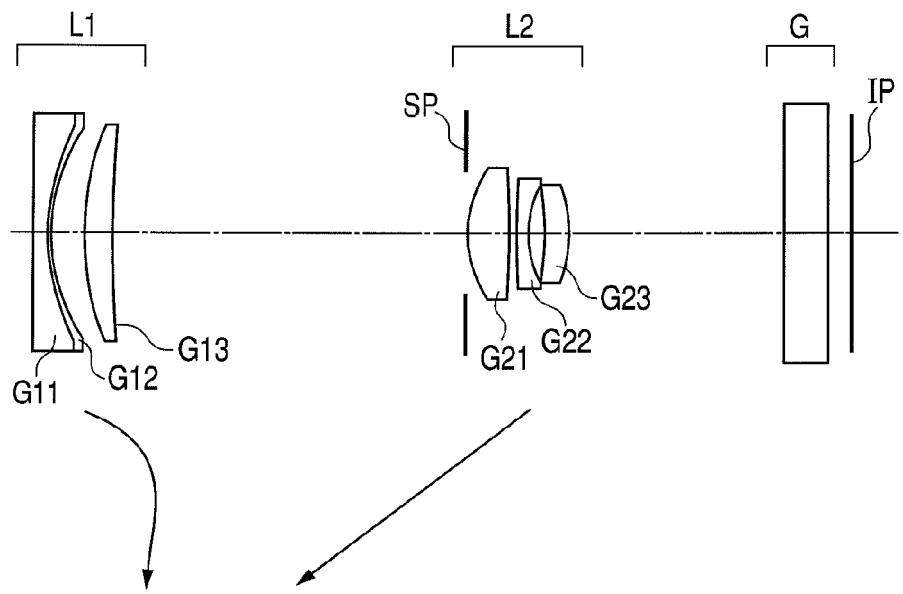
FIG. 9 is a sectional view of lenses according to a third embodiment of the present invention.
Figure 10:
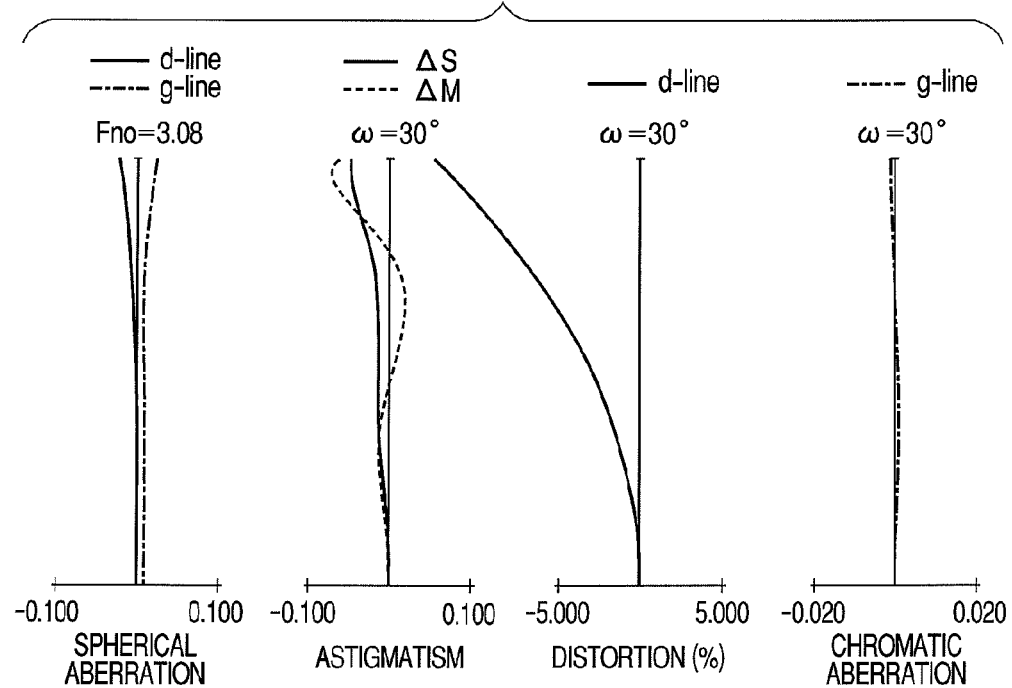
FIG. 10 is an aberration diagram at a wide angle end in the third embodiment.
Figure 11:
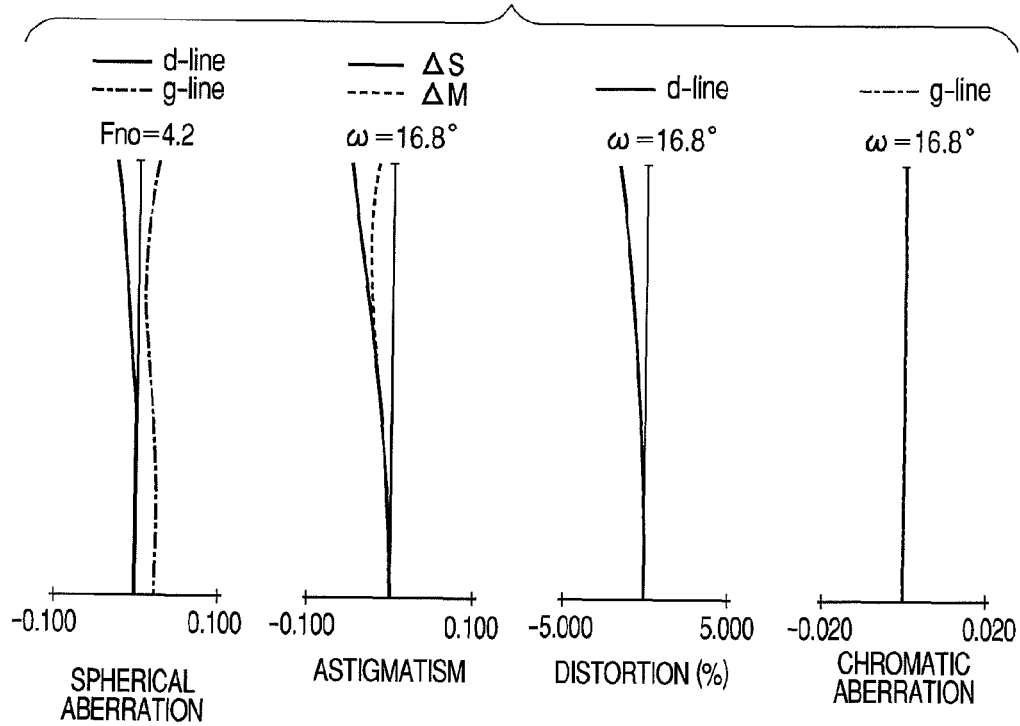
FIG. 11 is an aberration diagram in an intermediate zoom position according to the third embodiment.
Figure 12:
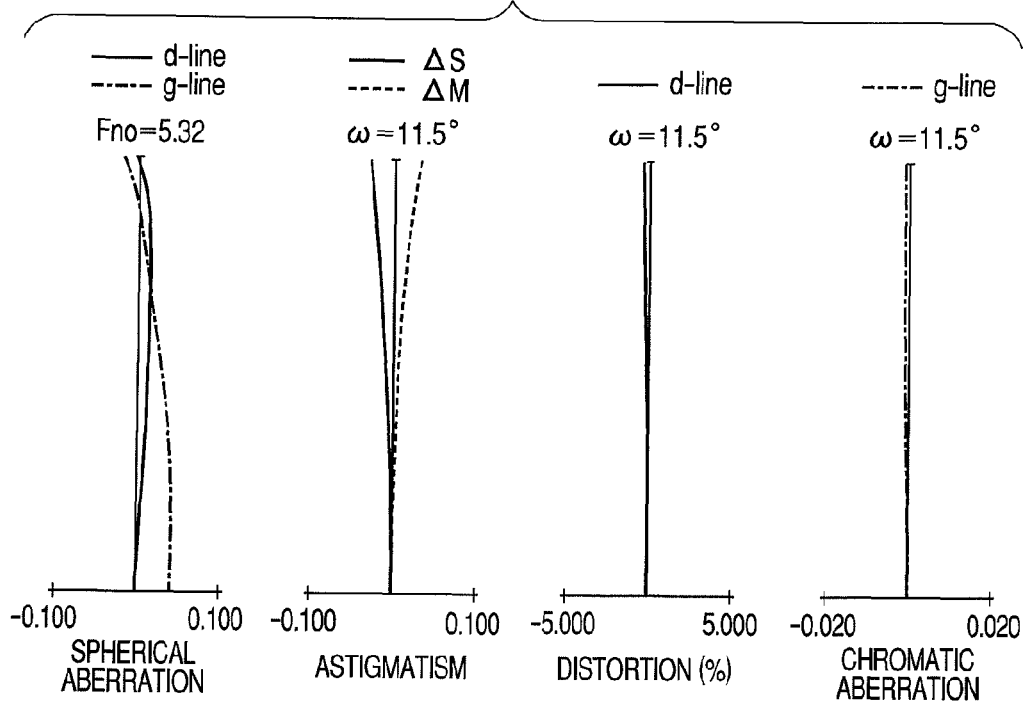
FIG. 12 is an aberration diagram at a telephoto end in the third embodiment.

FIG. 9 is a sectional view at a wide angle end of a zoom lens system according to a third embodiment of the present invention. FIGS. 10 to 12 are aberration diagrams at the wide angle end, in an intermediate zoom position, and at a telephoto end in the third embodiment, respectively. The zoom lens system according to the third embodiment is a zoom lens system in which a zoom ratio is 3 and an aperture ratio is about 3.1 to 5.3.

Figure 13:
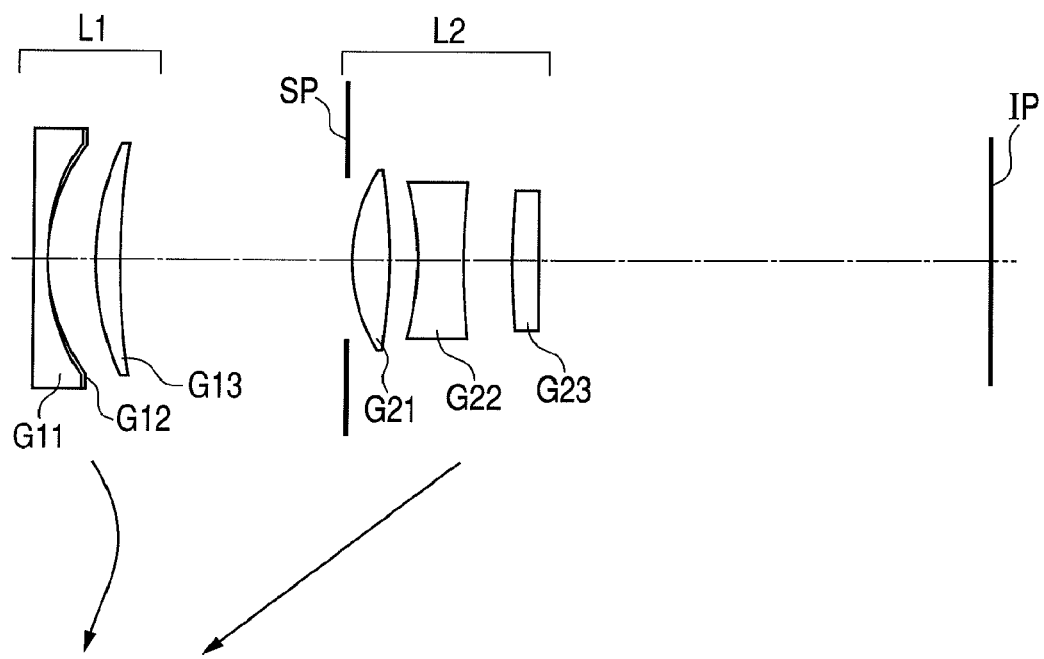
FIG. 13 is a sectional view of lenses according to a fourth embodiment of the present invention.
Figure 14:
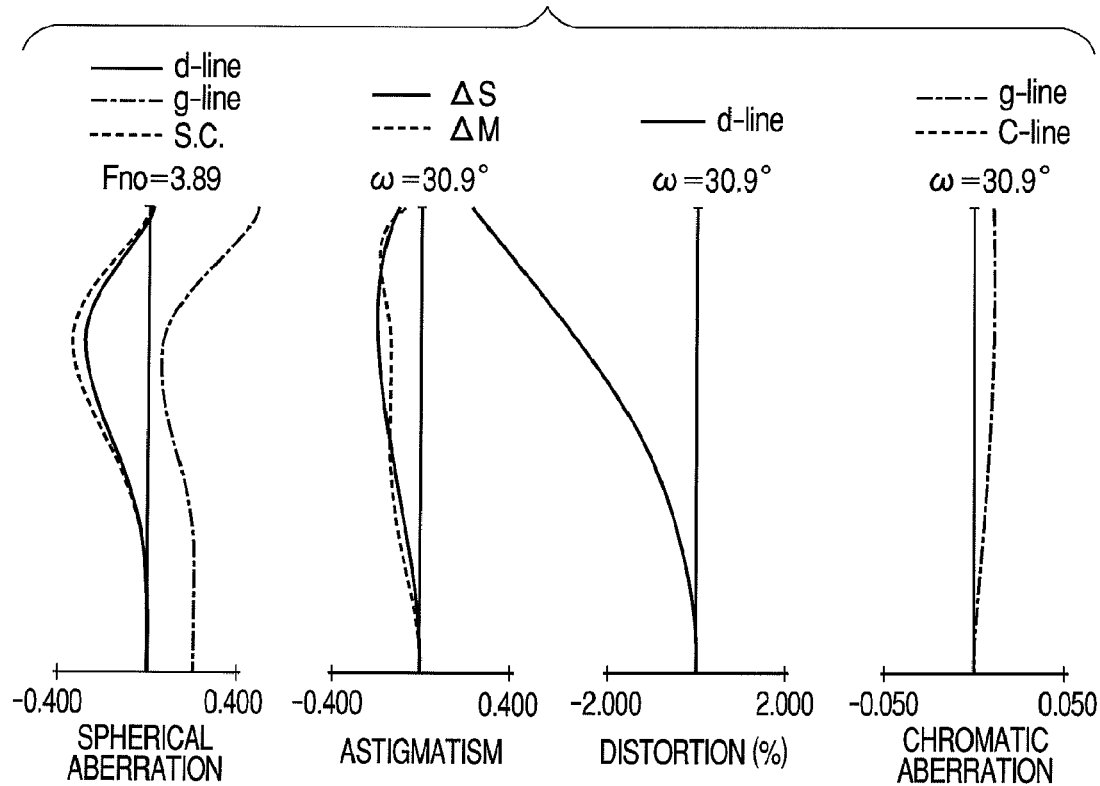
FIG. 14 is an aberration diagram at a wide angle end in the fourth embodiment.
Figure 15:
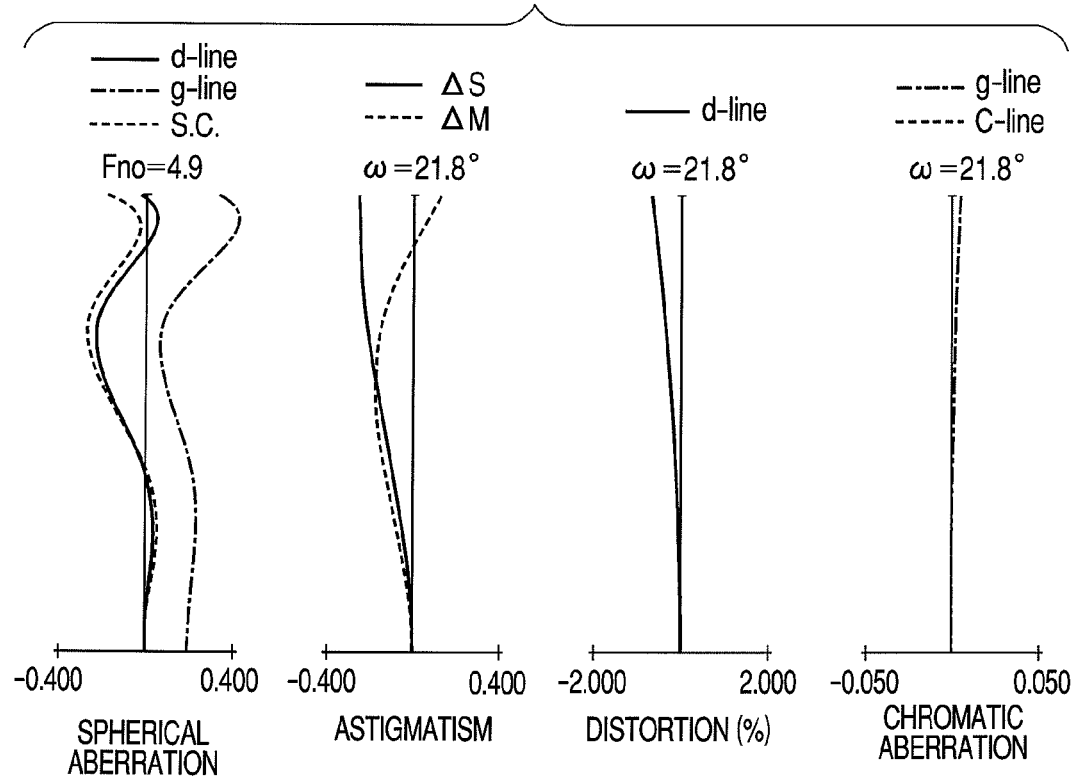
FIG. 15 is an aberration diagram in an intermediate zoom position in the fourth embodiment.
Figure 16:
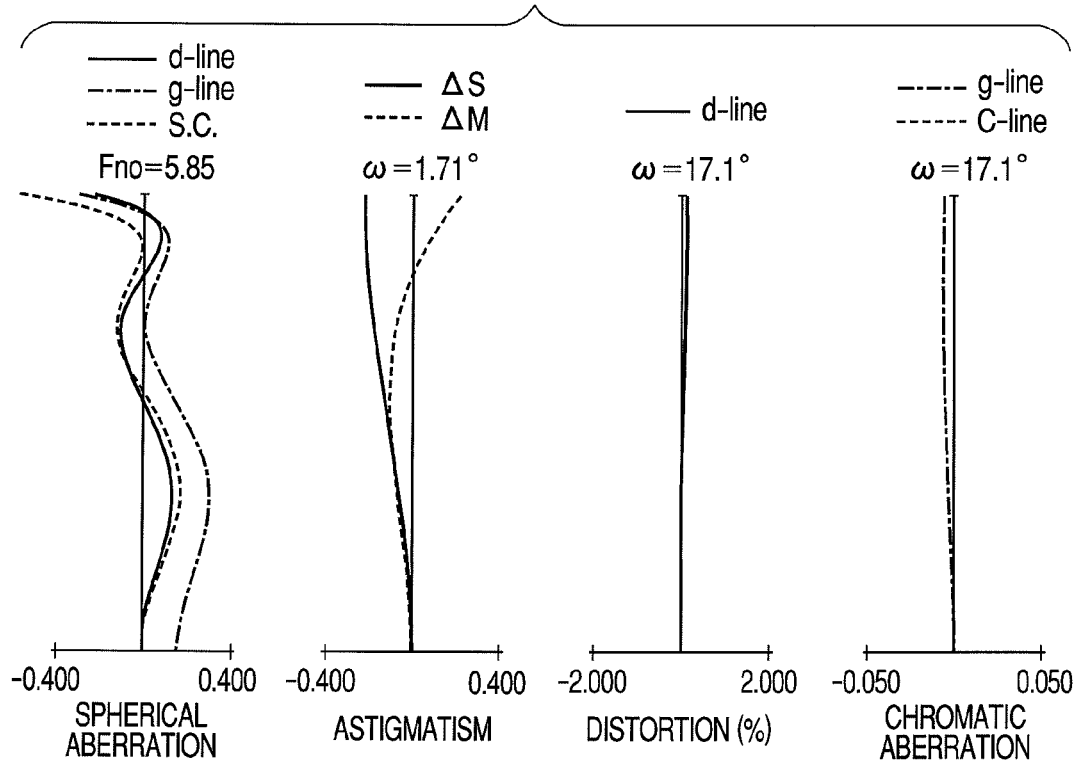
FIG. 16 is an aberration diagram at a telephoto end in the fourth embodiment.

FIG. 13 is a sectional view at a wide angle end of a zoom lens system according to a forth embodiment of the present invention. FIGS. 14 to 16 are aberration diagrams at the wide angle end, in an intermediate zoom position, and at a telephoto end in the fourth embodiment, respectively. The zoom lens system according to the fourth embodiment is a zoom lens system in which a zoom ratio is 2 and an aperture ratio is about 3.9 to 5.9.

Figure 17:
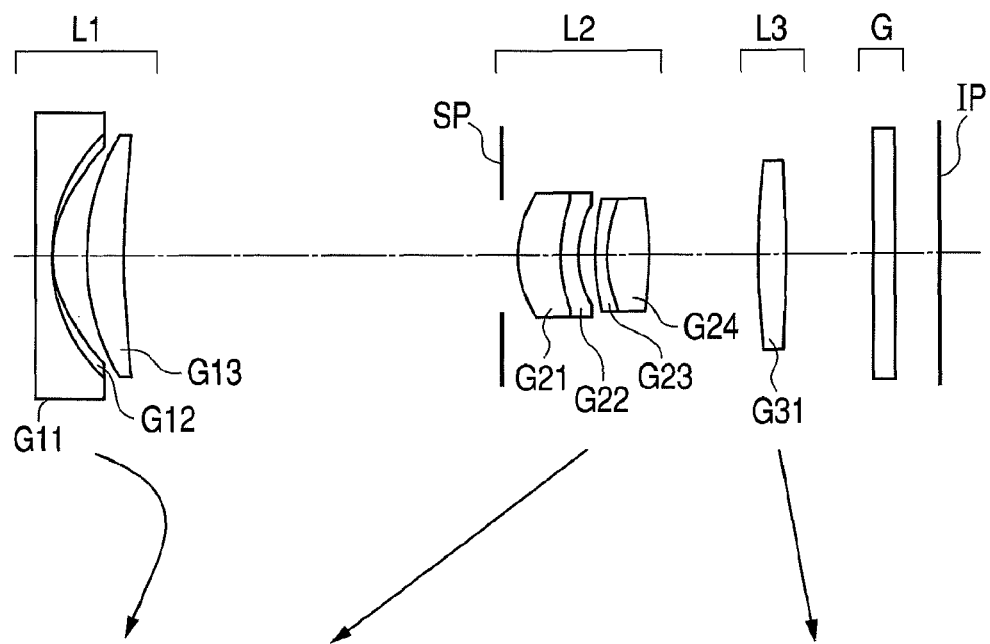
FIG. 17 is a sectional view of lenses according to a fifth embodiment of the present invention.
Figure 18:
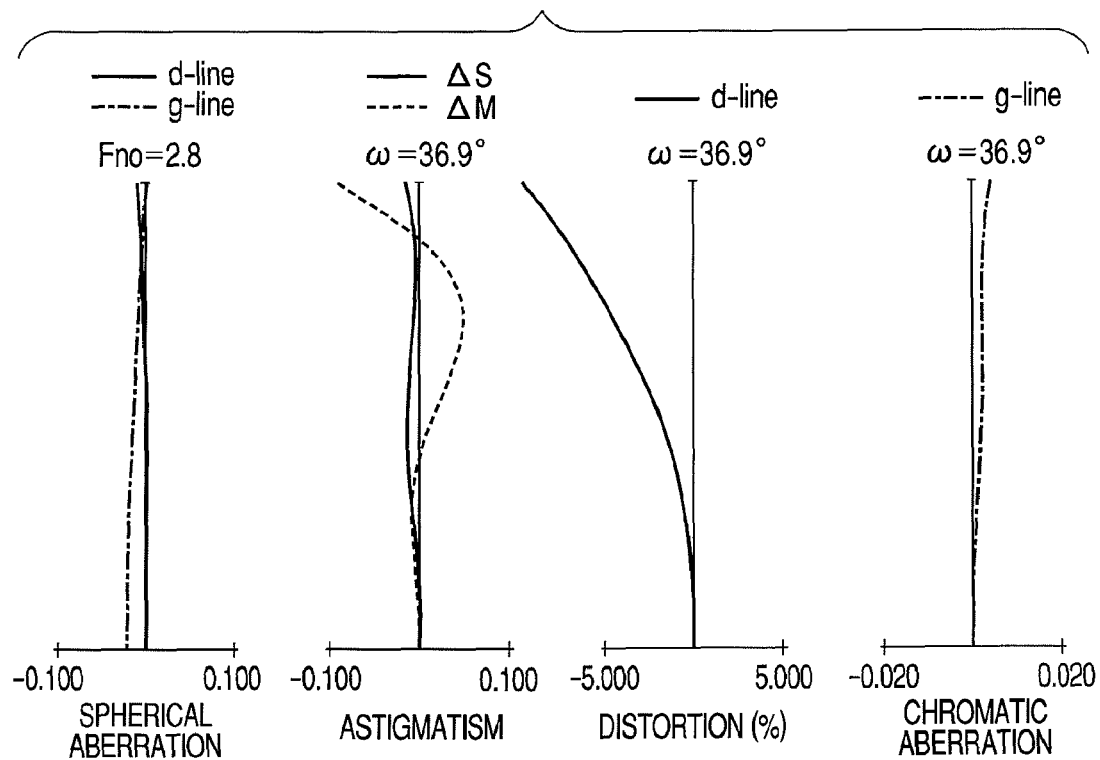
FIG. 18 is an aberration diagram at a wide angle end in the fifth embodiment.
Figure 19:
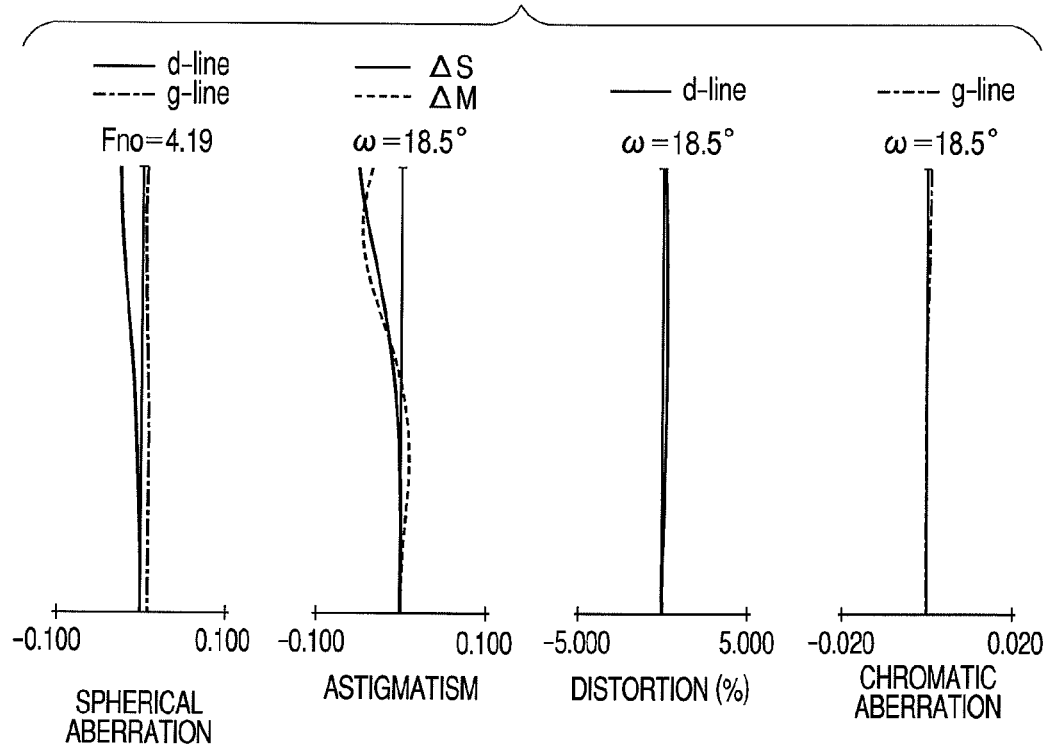
FIG. 19 is an aberration diagram in an intermediate zoom position in the fifth embodiment.
Figure 20:
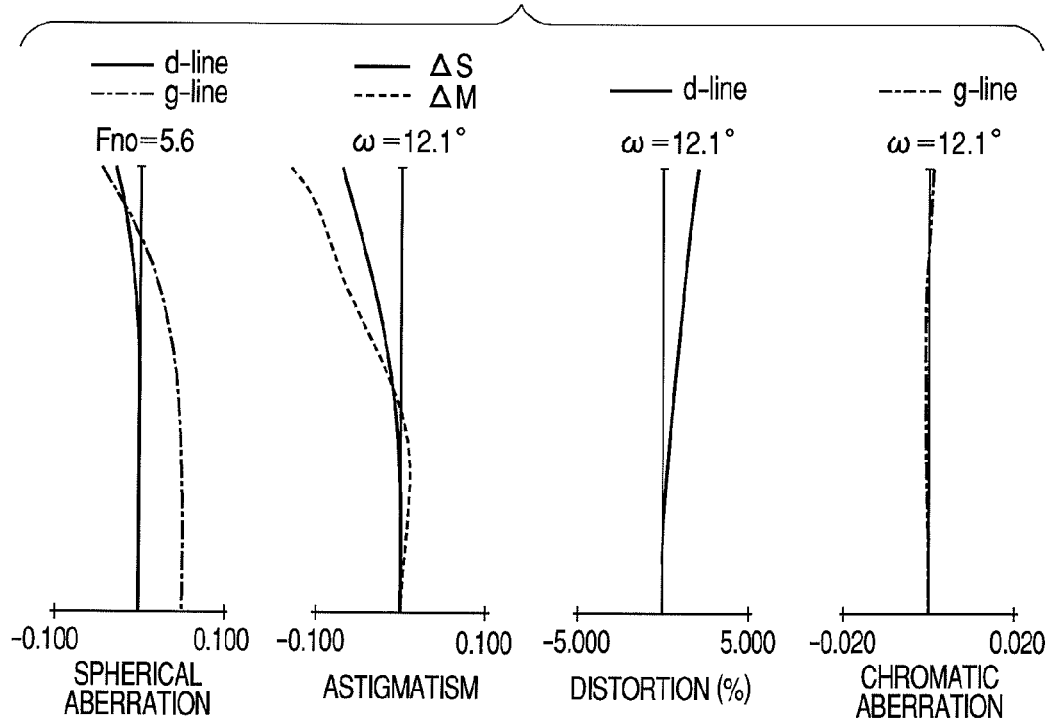
FIG. 20 is an aberration diagram at a telephoto end in the fifth embodiment.

FIG. 17 is a sectional view at a wide angle end of a zoom lens system according to a fifth embodiment of the present invention. FIGS. 18 to 20 are aberration diagrams at the wide angle end, in an intermediate zoom position, and at a telephoto end in the fifth embodiment, respectively. The zoom lens system according to the fifth embodiment is a zoom lens system in which a zoom ratio is 3 and an aperture ratio is about 2.8 to 5.6.

Figure 21:
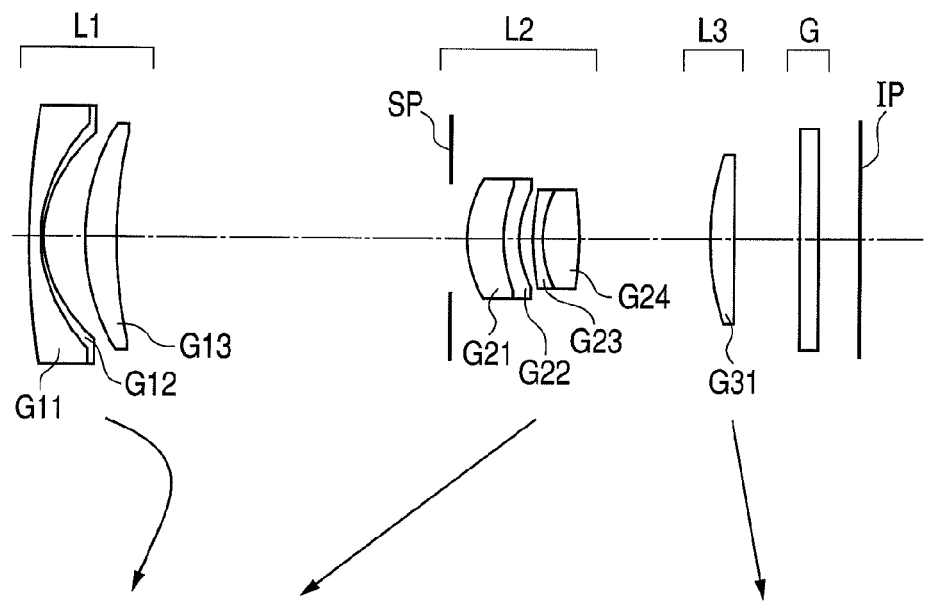
FIG. 21 is a sectional view of lenses according to a sixth embodiment of the present invention.
Figure 22:
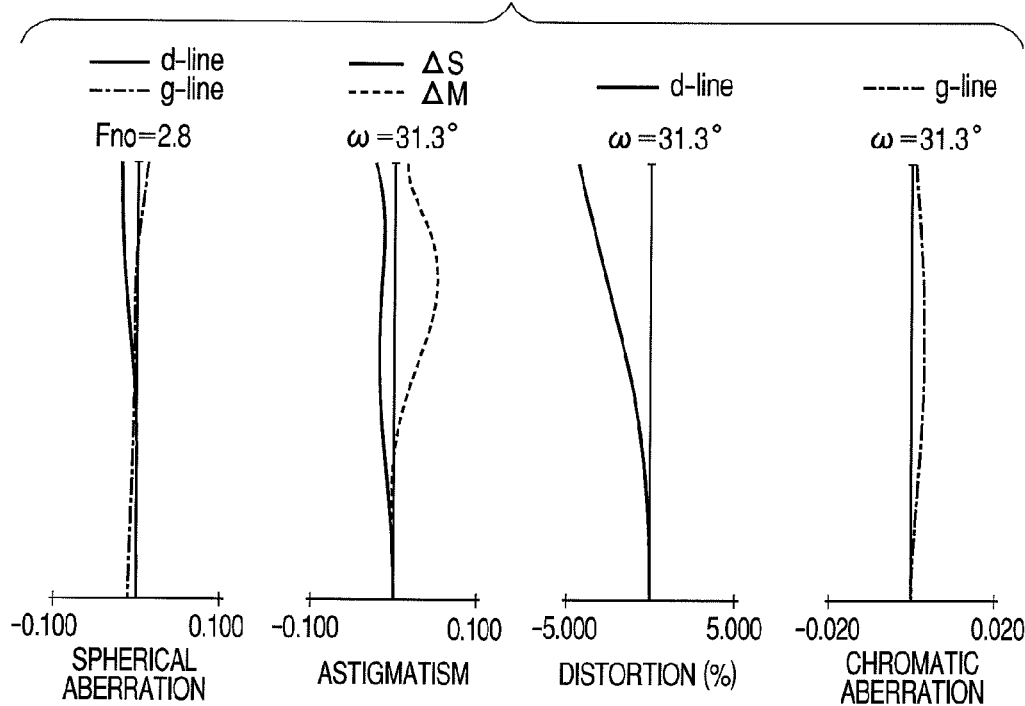
FIG. 22 is an aberration diagram at a wide angle end in the sixth embodiment.
Figure 23:
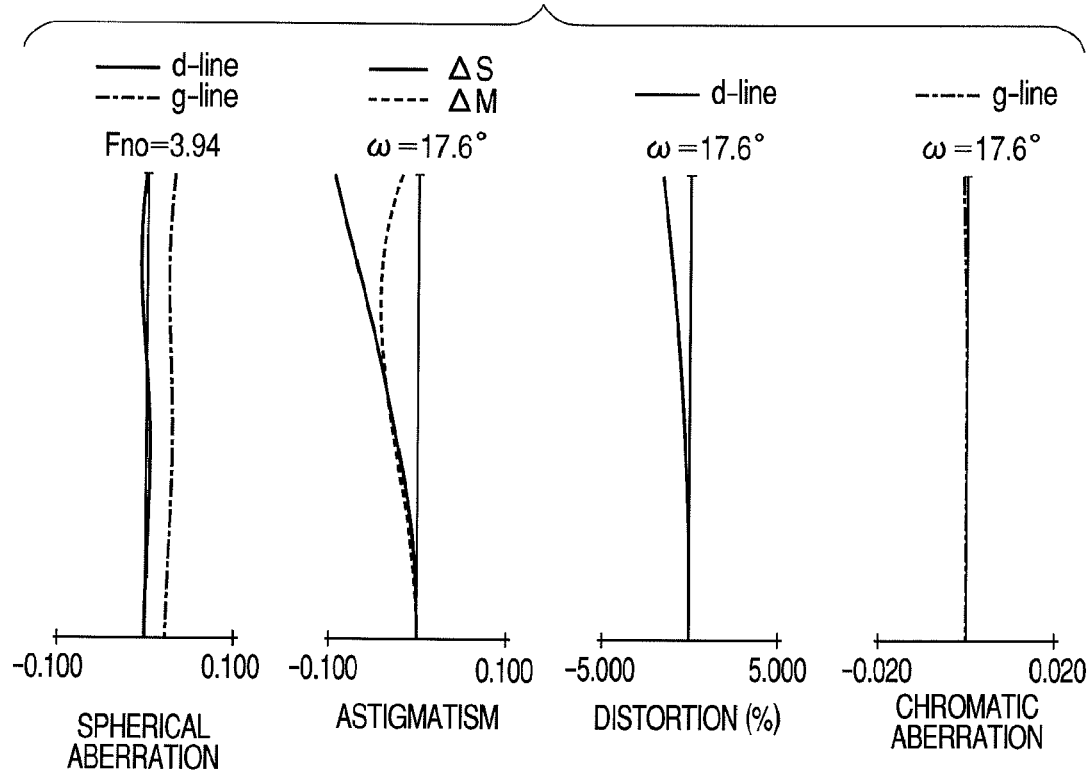
FIG. 23 is an aberration diagram in an intermediate zoom position in the sixth embodiment.
Figure 24:
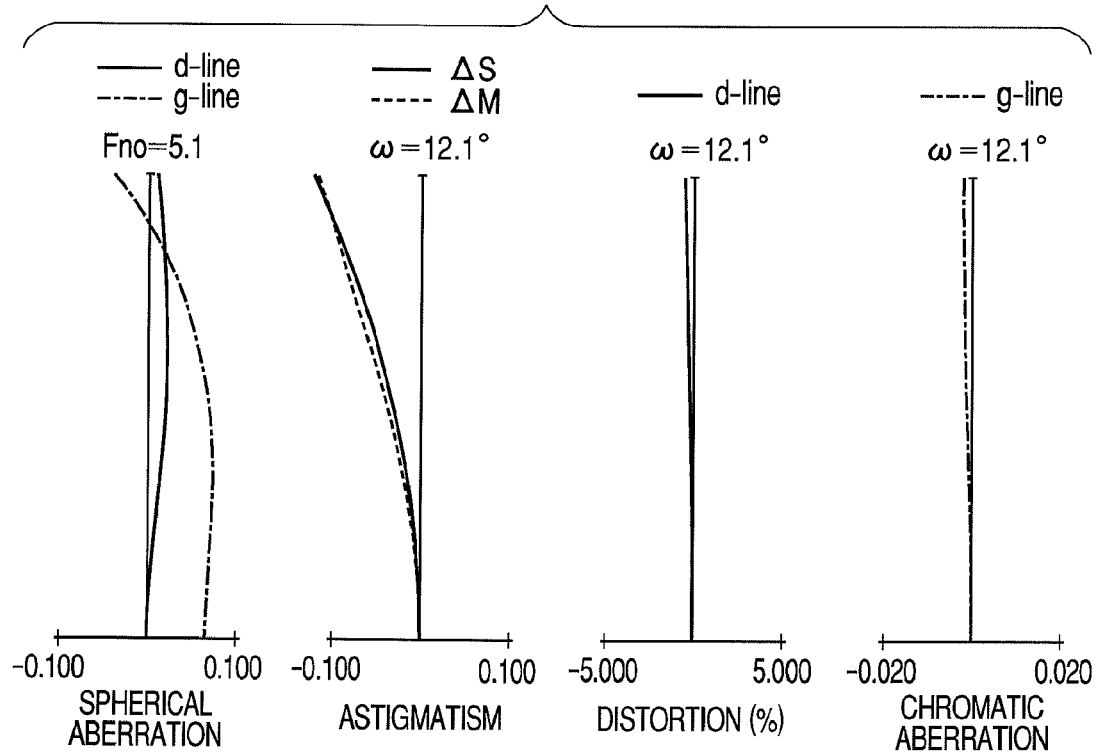
FIG. 24 is an aberration diagram at a telephoto end in the sixth embodiment.

FIG. 21 is a sectional view at a wide angle end of a zoom lens system according to a sixth embodiment of the present invention. FIGS. 22 to 24 are aberration diagrams at the wide angle end, in an intermediate zoom position, and at a telephoto end in the sixth embodiment, respectively. The zoom lens system according to the sixth embodiment is a zoom lens system in which a zoom ratio is 3 and an aperture ratio is about 2.8 to 5.0.

Figure 25:
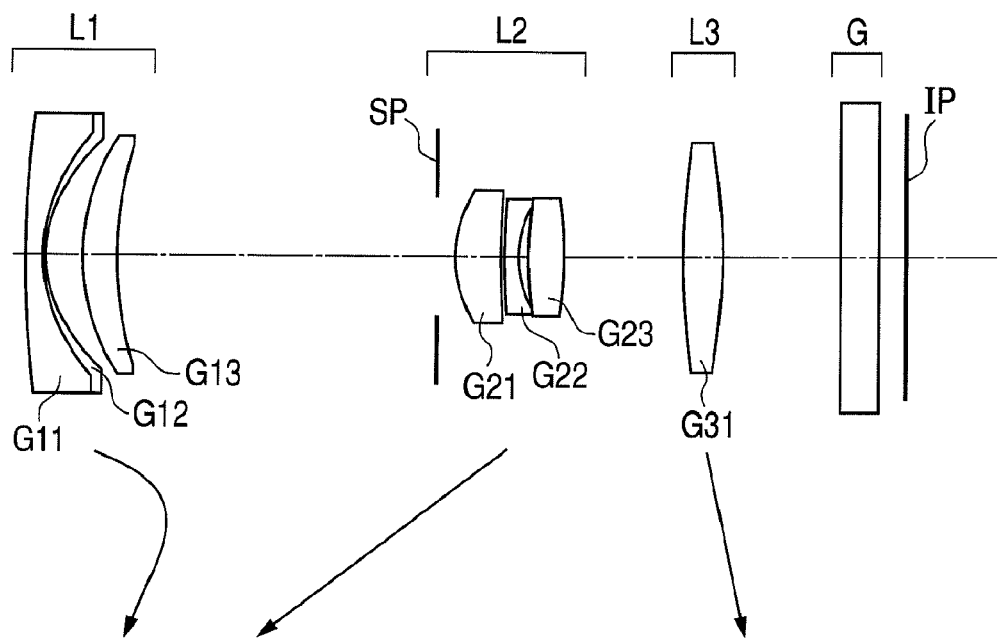
FIG. 25 is a sectional view of lenses according to a seventh embodiment of the present invention.
Figure 26:
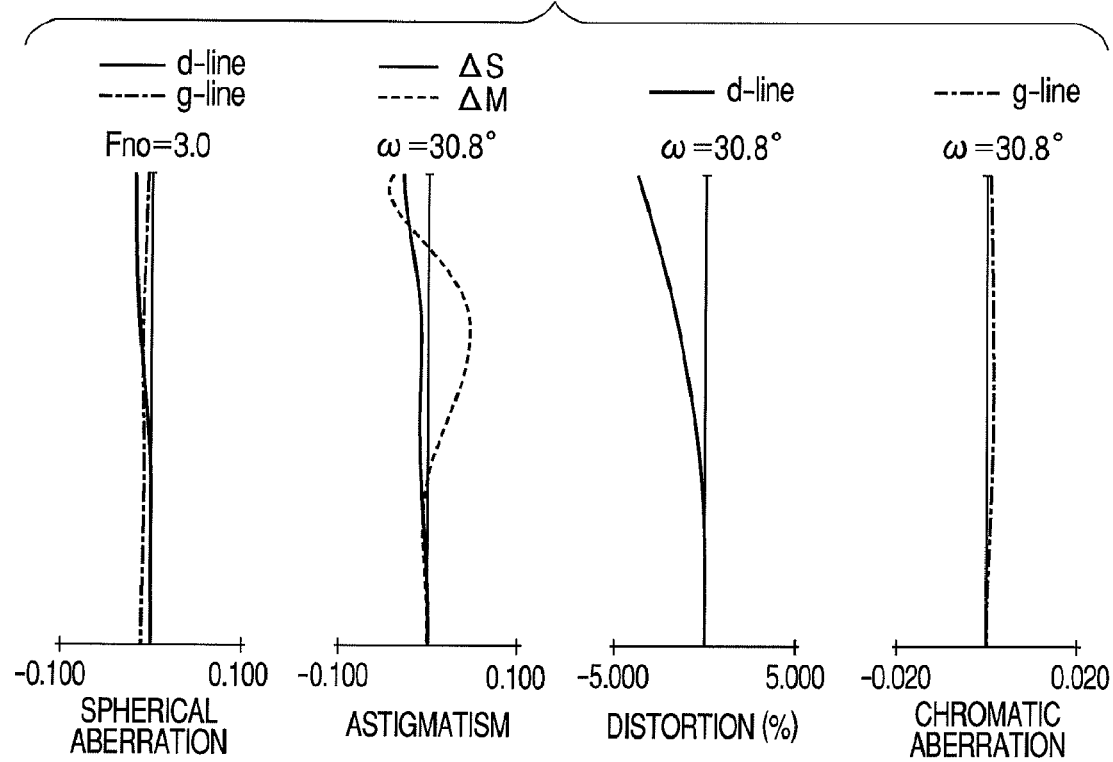
FIG. 26 is an aberration diagram at a wide angle end in the seventh embodiment.
Figure 27:
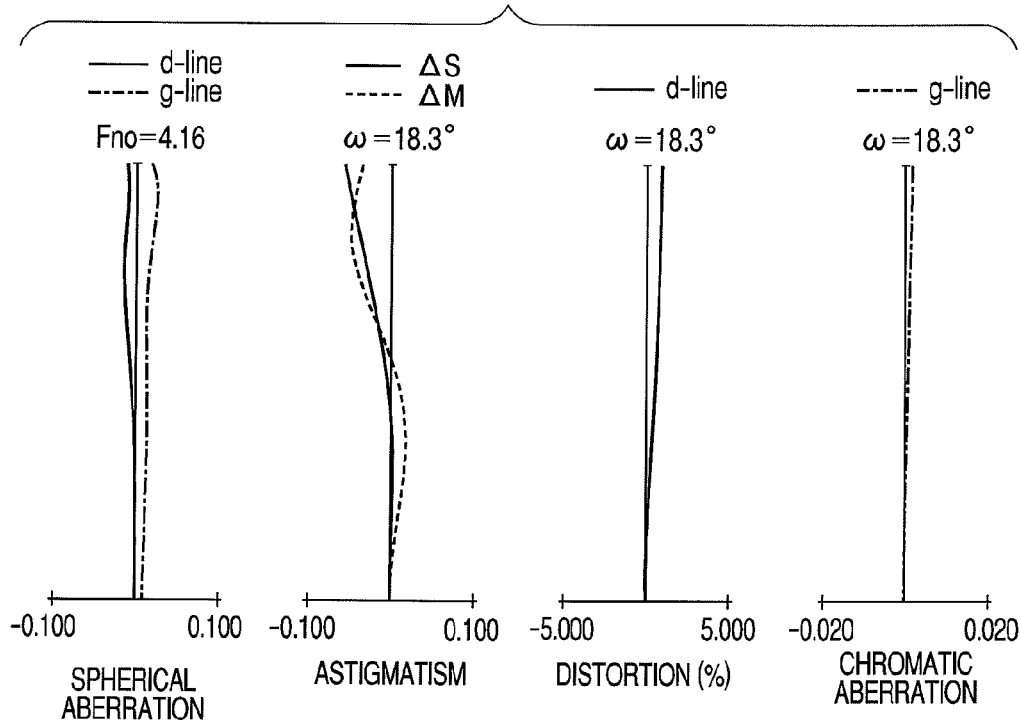
FIG. 27 is an aberration diagram in an intermediate zoom position in the seventh embodiment.
Figure 28:
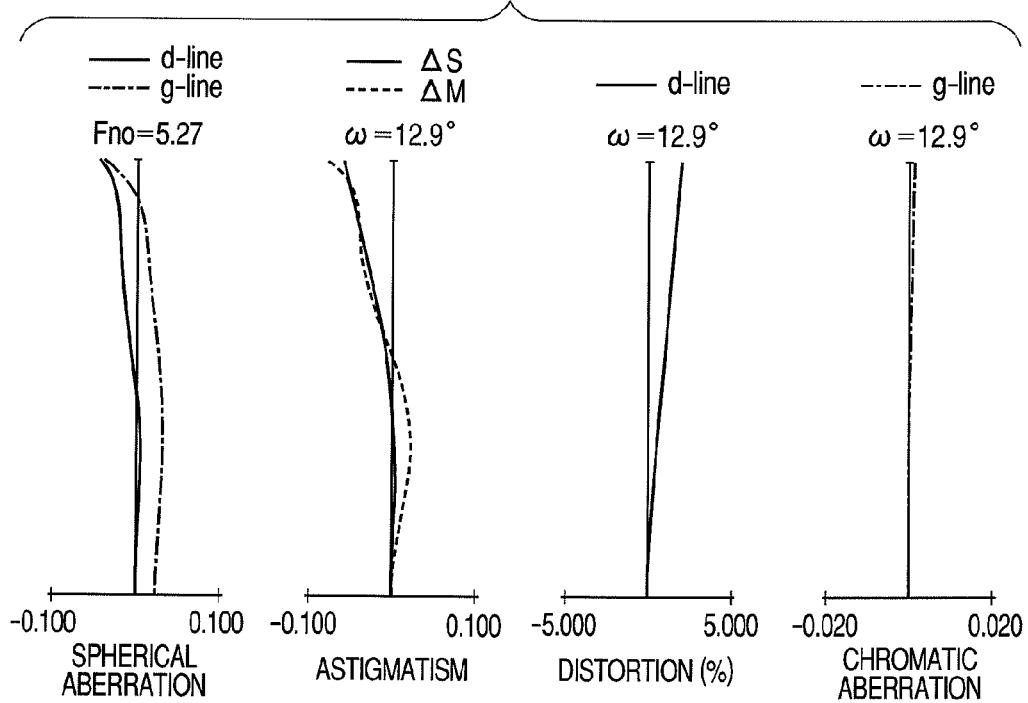
FIG. 28 is an aberration diagram at a telephoto end in the seventh embodiment.

FIG. 25 is a sectional view at a wide angle end of a zoom lens system according to a seventh embodiment of the present invention. FIGS. 26 to 28 are aberration diagrams at the wide angle end, in an intermediate zoom position, and at a telephoto end in the seventh embodiment, respectively. The zoom lens system according to the seventh embodiment is a zoom lens system in which a zoom ratio is 3 and an aperture ratio is about 3.0 to 5.3.

Figure 29:
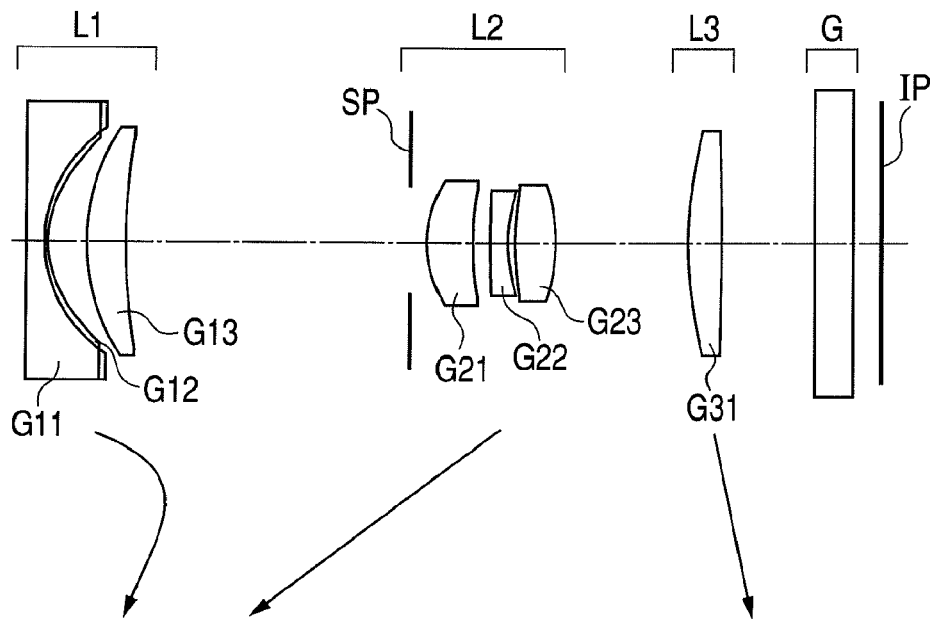
FIG. 29 is a sectional view of lenses according to an eighth embodiment of the present invention.
Figure 30:
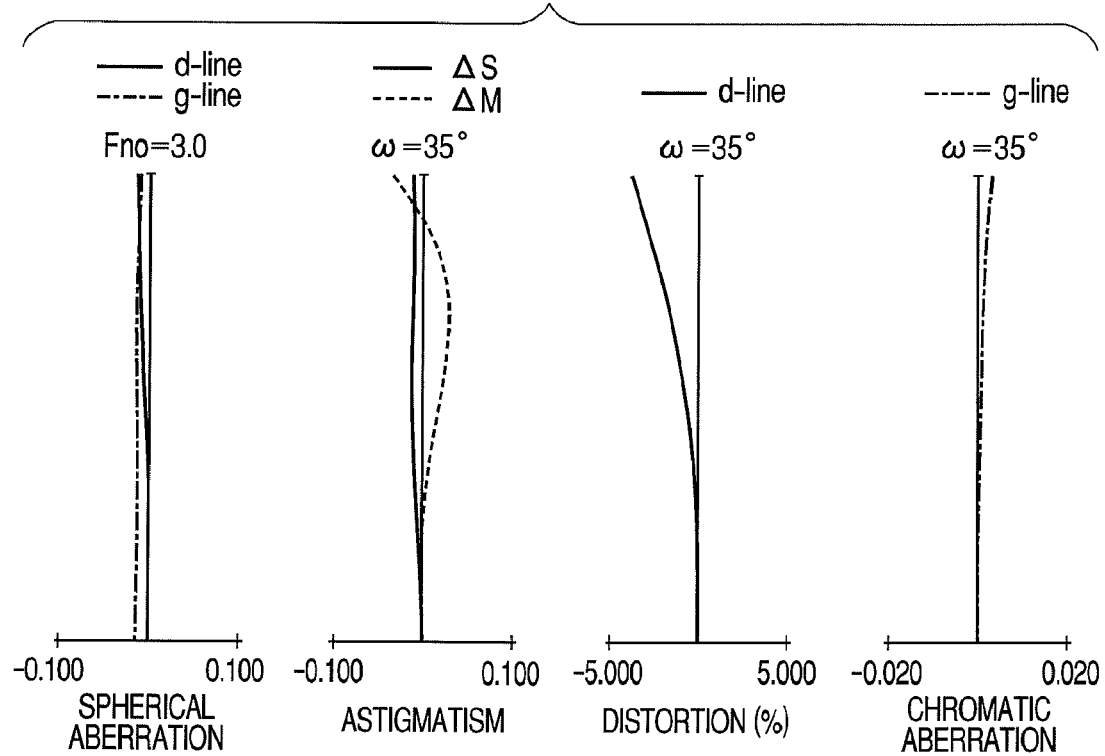
FIG. 30 is an aberration diagram at a wide angle end in the eighth embodiment.
Figure 31:
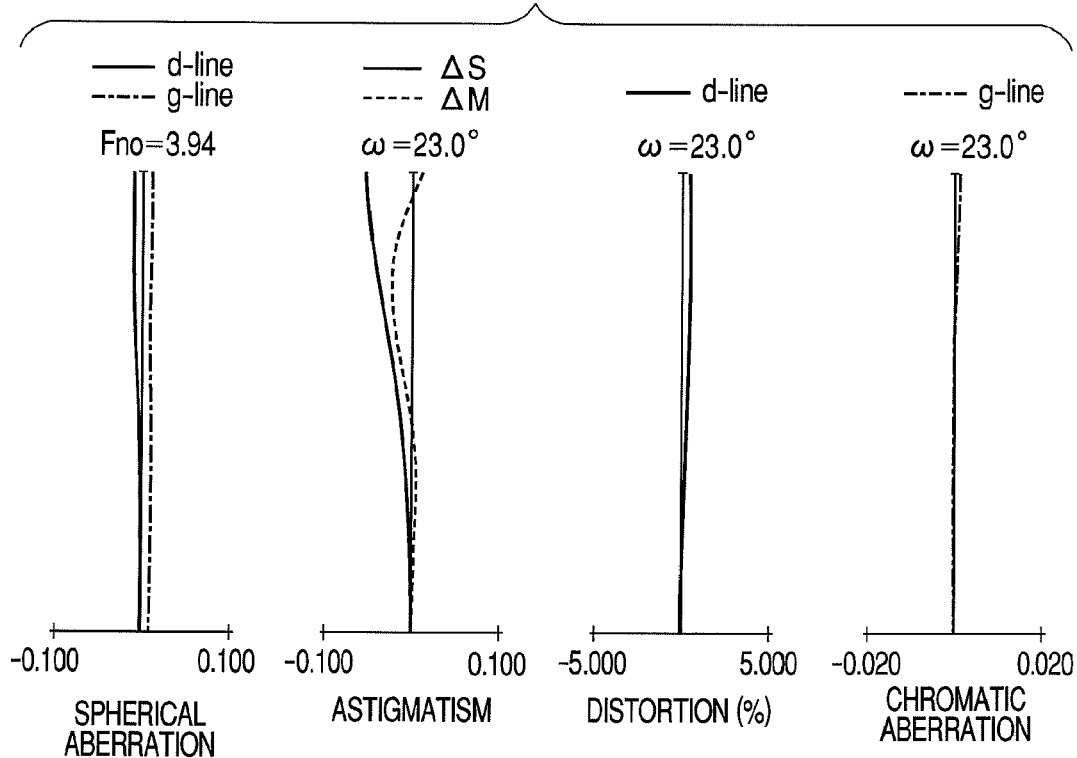
FIG. 31 is an aberration diagram in an intermediate zoom position in the eighth embodiment.
Figure 32:
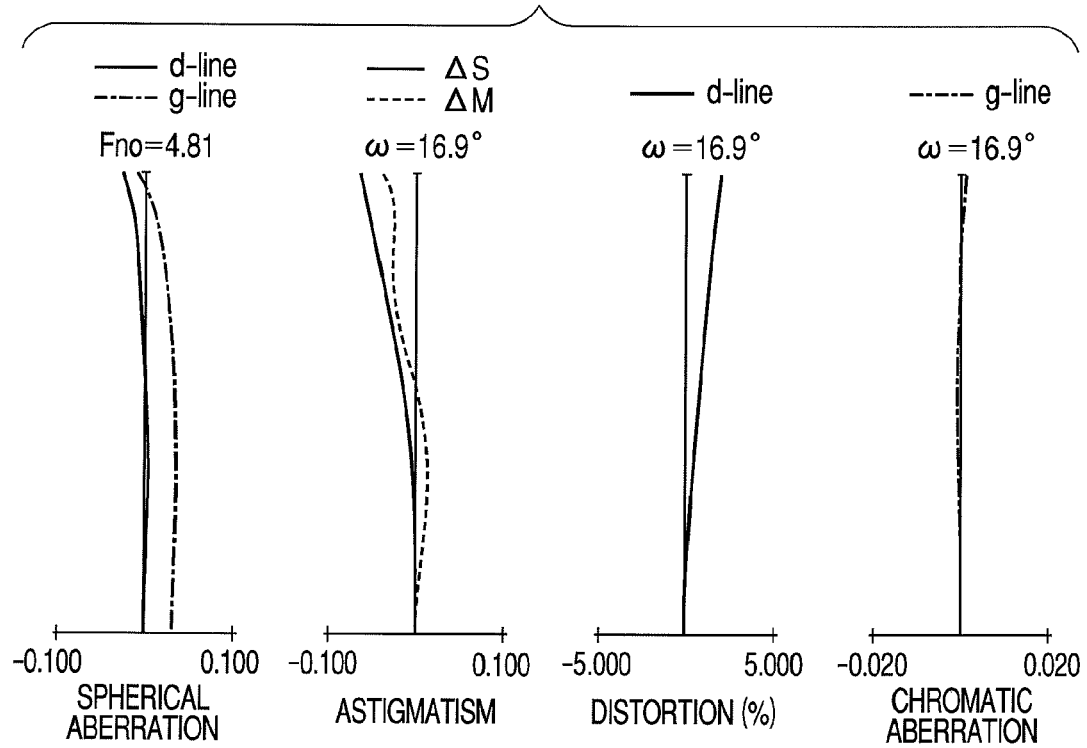
FIG. 32 is an aberration diagram at a telephoto end in the eighth embodiment.

FIG. 29 is a sectional view at a wide angle end of a zoom lens system according to an eighth embodiment of the present invention. FIGS. 30 to 32 are aberration diagrams at the wide angle end, in an intermediate zoom position, and at a telephoto end in the eighth embodiment, respectively. The zoom lens system according to the eighth embodiment is a zoom lens system in which a zoom ratio of 2 and an aperture ratio is about 3.0 to 4.8.

Figure 33:
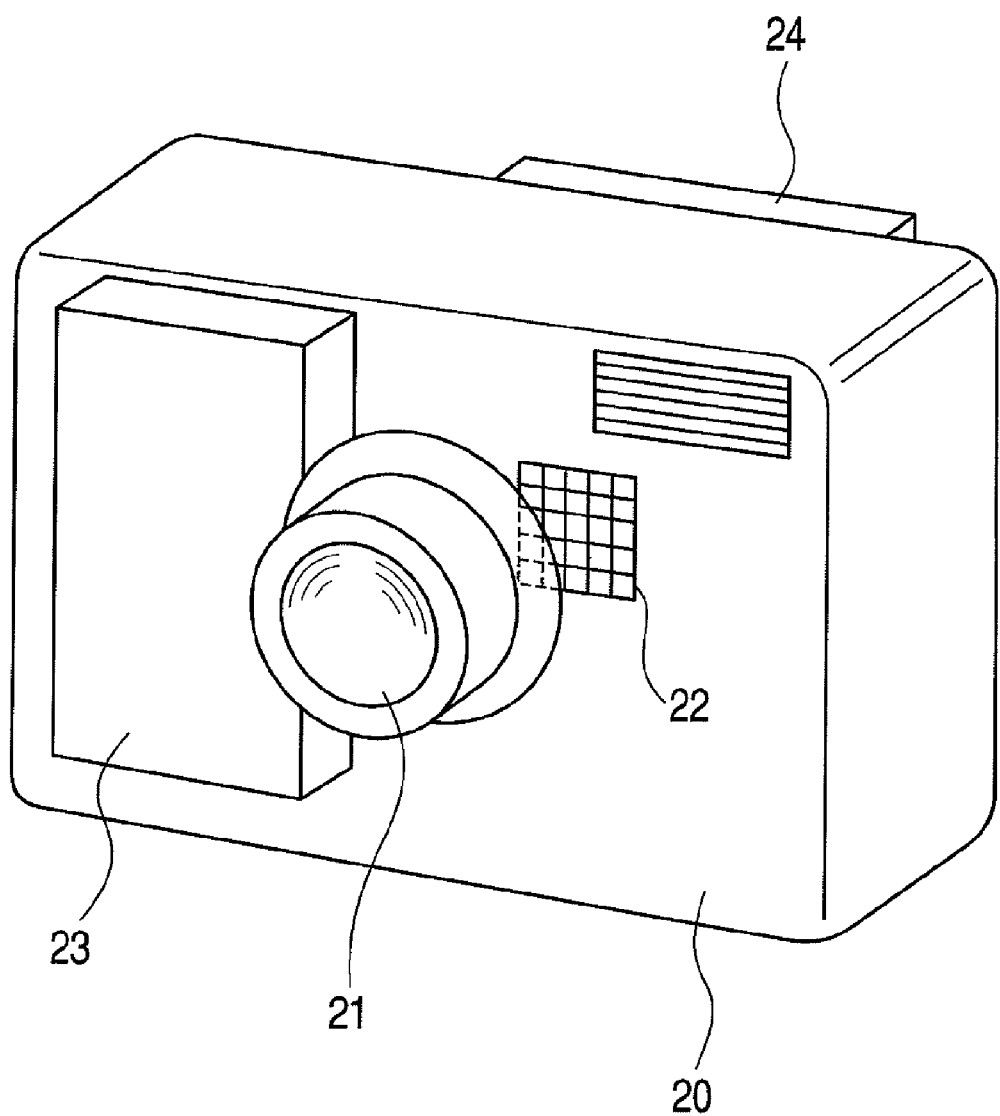
FIG. 33 is a schematic diagram of a main part of a camera according to the present invention.

FIG. 33 is a schematic diagram of a main part of the camera according to the present invention.

The zoom lens system according to each of the embodiments is an image pickup lens system used in a camera such as a video camera or a digital camera. In each of the sectional views of the lenses, the left is a subject (object) side (front) and the right is an image side (rear).

When the zoom lens system according to each of the embodiments is used in a projector, the left is equivalent to a screen surface side and the right is equivalent to a projected image plane side. In each of the sectional views of the lenses, "i" indicates order of a lens unit from the object side and Li indicates an ith lens unit.

In each of the sectional views of the lenses, L1 denotes a first lens unit having negative refractive power (optical power=inverse of the focal length), L2 denotes a second lens unit having positive refractive power, and L3 denotes a third lens unit having positive refractive power. SP denotes an aperture stop, which is located on the object side of the second lens unit L2.

G denotes a glass block equivalent to an optical filter, a face plate, a quartz low-pass filter, an infrared cut filer, or the like. IP denotes an image plane. When the camera is used as an image pickup optical system of a video camera or a digital still camera, a photosensitive surface equivalent to an image pickup surface of a solid state image pickup element (photoelectric conversion element) of a CCD sensor, a CMOS sensor, or the like is placed on the image plane.

In the aberration diagrams, "d" and "g" represent a d-line and a g-line, respectively. $\Delta M$ and $\Delta S$ represent a meridional image plane and a sagittal image plane, respectively. A lateral chromatic aberration is represented by the g-line. Fno represents an F number and $\omega$ represents a half angle of field.

In each of the embodiments, the wide angle end and the telephoto end refer to zoom positions at the time when a lens unit for zooming is located at both ends of a movable range on an optical axis in terms of a mechanism.

The zoom lens system according to each of the embodiments includes the first lens unit L1 having negative refractive power and the second lens unit L2 having positive refractive power in the stated order from the object side to the image side. In zooming from the wide angle end to the telephoto end, the lens units move as indicated by arrows illustrated in the sectional views of the lenses.

The zoom lens system according to each of the first to fourth embodiments includes the first lens unit L1 having negative refractive power and the second lens unit L2 having positive refractive power in the stated order from the object side to the image side. In zooming from the wide angle end to the telephoto end, the first lens unit L1 moves along a locus convex to the image side and the second lens unit L2 moves to the object side such that an interval between the lens units changes.

The zoom lens system according to each of the fifth to eighth embodiments includes the first lens unit L1 having negative refractive power, the second lens unit L2 having positive refractive power, and the third lens unit L3 having positive refractive power in the stated order from the object side to the image side.

In zooming from the wide angle end to the telephoto end, the first lens unit L1 performs a substantially reciprocal motion along a locus convex to the image side such that intervals among the lens units change. The second lens unit L2 moves to the object side and the third lens unit L3 moves to the image side.

In the zoom lens system according to each of the embodiments, main zooming is performed by the movement of the second lens unit L2 and variation in the image plane involved in the zooming is corrected by reciprocal motion of the first lens unit L1.

Here, performing the main zooming means that a ratio of imaging magnification with respect to the telephoto end and the wide angle end is the largest compared with those of the other lens units.

In the fifth to eighth embodiments, in zooming from the wide angle end to the telephoto end, the third lens unit L3 is moved to the image side independently from the other lens units. However, for zooming, the third lens unit L3 may not move. When the third lens unit L3 does not move, a mechanical member, an actuator, and the like necessary for driving are unnecessary.

In the first to fourth embodiments, focus from an infinite object to a close object is performed by extending the first lens unit L1 forward.

Further, in the fifth to eighth embodiments, focus from the infinite object to the close object is performed by extending the third lens unit L3 forward. The third lens unit L3 includes a small number of lenses, and hence it is easy to reduce the size of a focus lens unit.

In each of the embodiments, the first lens unit L1 includes a first lens component G11 having negative refractive power, a second lens component G12 having negative refractive power, and a third lens component G13 having positive refractive power in the stated order from an object side to an image side.

The first lens unit L1 includes the first lens component G11 having negative refractive power and the third lens component G13 having positive refractive power, whereby, while achromatization in the first lens unit L1 is satisfactorily performed, the entire lens system is configured compact.

Further, when a refractive index with respect to a d-line of a material of the first lens component G11 and an Abbe number thereof are represented as Nd1$n$ and vd1$n$, respectively, the following condition is satisfied.

$$2.45 < Nd1n - (9.3 \times 10^{-5} \times vd1n^2 - 1.7 \times 10^{-2} \times vd1n) < 3.00 \quad (1)$$

$$5.0 < vd1n < 80.0 \quad (2)$$

The Abbe number is an Abbe number (vd) of a material with reference to a d-line represented by the following formula.

$$vd = (Nd-1)/(NF-NC)$$

Nd: Refractive index with respect to a d-line (wavelength 587.6 nm)
NF: Refractive index with respect to an F-line (wavelength 486.1 nm)
NC: Refractive index with respect to a C-line (wavelength 656.3 nm)

The conditional expressions (1) and (2) are conditional expressions concerning a refractive index and an Abbe number of the material of the first lens component G11 of the first lens unit L1.

The conditional expression (1) is an expression for reducing occurrence of aberrations using a material having a high refractive index compared with the conventional glass material.

In the negative-lead zoom lens system, it is advisable to use a glass material having a high refractive index and low dispersion in order to correct chromatic aberration when the first lens unit includes a small number of lenses equal to or smaller than two. When a material having a high refractive index is used for the first lens component G11, it is possible to correct field curvature, distortion, and the like by reducing an opening angle of a surface on the image side of the first lens component G11. This makes it easy to reduce the thickness of the first lens unit L1 and reduce the size of the entire lens system.

When the upper limit of the conditional expression (1) is exceeded, it is difficult to obtain a material that can be used as an optical material. When the lower limit of the conditional expression (1) is exceeded, it is difficult to reduce the size of the entire system.

When the upper limit of the conditional expression (2) is exceeded, the Abbe number of the material of the first lens component G11 decreases to be excessively small, and a material of the third lens component G13 forming a pair with the material of the first lens component G11 for achromatization decreases. As a result, it is difficult to perform achromatization in the first lens unit L1.

More preferably, the numerical value ranges of the conditional expressions (1) and (2) are set in the following ranges.

$$2.45 < Nd1n - (9.3 \times 10^{-5} \times vd1n^2 - 1.7 \times 10^{-2} \times vd1n) < 2.90 \quad (1a)$$

$$10.0 < vd1n < 78.0 \quad (2a)$$

Still more preferably, the numerical value ranges of the conditional expressions (1a) and (2a) are set in the following ranges.

$$2.45 < Nd1n - (9.3 \times 10^{-5} \times vd1n^2 - 1.7 \times 10^{-2} \times vd1n) < 2.80 \quad (1b)$$

$$15.0 < vd1n < 75.0 \quad (2b)$$

As a material satisfying the conditional expressions (1) and (2), there are, for example, $TiO_2$ (Nd=2.304, vd=13.8) and $KTaO_3$ (Nd=2.367, vd=17.3). Besides, there are, for example, "Lumicera" (registered trademark) (Nd=2.095, vd=29.4) manufactured by Murata Manufacturing Co., Ltd. and other oxide ceramics.

In each of the embodiments, a surface on the image side of the second lens component G12 having negative refractive power of the first lens unit L1 is formed in an aspherical shape. Field curvature and distortion at a wide angle end are satisfactorily corrected by forming the surface on the image side of the second lens component G12 in an aspherical shape.

In general, it is difficult to process a material present in an area satisfying the conditional expressions (1) and (2). Therefore, the aspherical surface is formed as a complex optical element obtained by forming a resin on a base material. This makes it possible to easily give an aspherical effect to the first lens component.

As described above, in the negative-lead zoom lens system including two or three lens units according to each of the embodiments, the lens configuration of the first lens unit having negative refractive power is appropriately set as described above, whereby high optical performance is obtained over the entire zoom range while a reduction in size of the entire system is realized.

In the zoom lens system according to each of the embodiments, in order to obtain further satisfactory optical performance and realize a reduction in size of the entire lens system, it is advisable to satisfy at least one conditional expression described below.

First, when the refractive power of the first lens unit L1 is represented as $\Phi 1$, the refractive power of an ith lens component is represented as $\phi 1i$, and a refractive index on a d-line of a material of the ith lens component is represented as N1$i$, $$\Sigma |\phi 1i/\Phi 1| = (|\phi 11| + |\phi 12| + |\phi 13|)/\Phi 1$$

$$\Sigma |N1i \times \phi 1i/\Phi 1| = (N11 \times |\phi 11| + N12 \times |\phi 12| + N13 \times |\phi 13|)/\Phi 1$$

It is desirable that the following condition is satisfied.

$$2.0 < \Sigma |\phi 1i/\Phi 1| < 3.5 \quad (3)$$

$$5.35 < \Sigma |N1i \times \phi 1i/\Phi 1| < 10.00 \quad (4)$$

The conditional expression (3) is a conditional expression concerning a sum of absolute values of refractive powers of the lens components in the first lens unit L1. The conditional expression (4) is a conditional expression for specifying a sum of refractive indexes of materials of the lens components in the first lens unit L1 weighted by the refractive powers of the lens components and reducing the size of the entire zoom lens system.

In order to realize a reduction in thickness of the first lens unit L1, it is desirable that the refractive powers of the lenses components in the first lens unit L1 appropriately intensify each other. When the upper limit of the conditional expression (3) is exceeded, the refractive powers of the lens components increase to be excessively large. Therefore, it is difficult to reduce the thickness of the first lens unit L1.

On the other hand, when the lower limit of the conditional expression (3) is exceeded, the refractive power of the entire system of the first lens unit L1 as well as the refractive powers of the lens components decreases to be excessively small. Therefore, the size of the entire zoom lens system undesirably increases.

Further, in order to realize a reduction in thickness of the first lens unit L1, it is desirable that the refractive indexes of the materials of the lens components in the first lens unit L1 are large. When an upper limit of the conditional expression (4) is exceeded, the refractive powers of the lens components as well as the refractive indexes of the materials of the lens components undesirably increase. When the lower limit of the conditional expression (4) is exceeded, the refractive indexes of the materials of the lens components decrease. Therefore, it is difficult to reduce the size of the first lens unit L1.

In each of the embodiments, the first lens unit L1 is configured to satisfy the conditional expressions (3) and (4) to easily realize a reduction in size of the zoom lens system.

More preferably, numerical value ranges of the conditional expressions (3) and (4) are set as follows.

$$2.3 < \Sigma |\phi 1i/\Phi 1| < 3.2 \quad (3a)$$

$$5.40 < \Sigma |N1i \times \phi 1i/\Phi 1| < 8.00 \quad (4a)$$

When the focal length of the second lens component G12 is represented as fr and the focal length of the entire system at a wide angle end is represented as fw, it is desirable that the following condition is satisfied.

$$2.0 < |f1r/fw| < 100.0 \quad (5)$$

The conditional expression (5) is a conditional expression concerning the focal length of the second lens component G12 configuring the optical element. When the second lens component G12 is stacked to join the first lens component G11, which configures the first lens unit L1 and satisfies the conditional expressions (1) and (2), and to have an aspherical surface, the refractive power is also given to the second lens component G12. Accordingly, the second lens component G12 is caused to share the achromatization in the first lens unit L1. Therefore, it is easy to correct chromatic aberration.

When the refractive index of the material of the first lens component G11 in the first lens unit L1 is set high, in order to prevent deterioration in a Petzval sum, it is also necessary to set the refractive index of the material of the third lens component G13 in the first lens unit L1 higher.

However, when it is attempted to set the refractive index of the material of the third lens component G13 high, the material of the third lens component G13 is highly dispersed compared with the first lens component G11 made of a low dispersed material. Therefore, it is difficult to correct chromatic aberration with good balance.

In this case, if a material more highly dispersed than the base material (first lens component G11) is used for the material forming the second lens component G12 to share the negative refractive power, it is easier to select a material having a higher refractive index and high dispersion for the second lens component G12.

As a result, it is easier to reduce the thickness of the first lens unit L1.

When the upper limit of the conditional expression (5) is exceeded, the refractive power of the second lens component G12 decreases and the sharing of the refractive power becomes insufficient. Further, when the upper limit is exceeded, the refractive power of the second lens component G12 increases. Therefore, the thickness of resin to be molded undesirably excessively increases.

In each of the embodiments, the refractive power of the second lens component G12 is set to satisfy the conditional expression (5) to easily realize a reduction in size of the zoom lens system.

More preferably, a numerical value range of the conditional expression (5) is set in the following range.

$$3.0 < |f1r/fw| < 50.0 \quad (5a)$$

When the focal length of the first lens unit L1 is represented as f1, it is desirable that the following condition is satisfied.

$$1.0 < |f1/fw| < 3.0 \quad (6)$$

The conditional expression (6) is a conditional expression concerning the refractive power of the first lens unit L1 and for mainly realizing a reduction in size of the entire zoom lens system.

When the upper limit of the conditional expression (6) is exceeded, the negative refractive power of the first lens unit L1 decreases to be excessively small and the entire system is increased in size. When the lower limit of the conditional expression (6) is exceeded, the refractive power of the first lens unit L1 increases to be excessively large. Therefore, it is difficult to reduce the thickness of the lenses in the first lens unit L1 and correct field curvature and distortion.

In each of the embodiments, the first lens unit L1 is configured to satisfy the conditional expression (6) to realize a reduction in size of the zoom lens system.

More preferably, a numerical value range of the conditional expression (6) is set in the following range.

$$1.0 < |f1/fw| < 2.50 \quad (6a)$$

More preferably, a numerical value range of the conditional expression (6a) is set in the following range.

$$1.0 < |f1/fw| < 2.40 \quad (6b)$$

When the focal length of the second lens unit L2 is represented as f2, it is desirable that the following condition is satisfied.

$$0.5 < f2/fw < 2.5 \quad (7)$$

The conditional expression (7) is a conditional expression concerning the refractive power of the second lens unit L2 and for realizing a reduction in size of the entire zoom lens system.

When the upper limit of the conditional expression (7) is exceeded, the refractive power of the second lens unit L2 decreases to be excessively small, a stroke by zooming increases, and the entire system is increased in size. When the lower limit of the conditional expression (7) is exceeded, the refractive power of the second lens unit L2 increases to be excessively large. Therefore, it is difficult to reduce the thickness of the lenses in the second lens unit L2 and correct spherical aberration and coma aberration.

In each of the embodiments, the lenses in the second lens unit L2 is configured to satisfy the conditional expression (7) to realize a reduction in size of the zoom lens system.

More preferably, a numerical value range of the conditional expression (7) is set in the following range.

$$0.70 < f2/fw < 2.40 \quad (7a)$$

Next, specific characteristics of the lens configuration in each of the embodiments are described in detail.

In each of the embodiments, the first lens unit L1 is configured as described below in the stated order from the object side to the image side.

The first lens unit L1 includes the first lens component (negative lens) G11 having negative refractive power, the second lens component (negative lens) G12 having negative refractive power and a surface on the image side formed in an aspherical shape, and the third lens component (positive lens) having positive power and a convex surface on the object side formed in a meniscus shape. The first lens component G11 and the second lens component G12 are joined.

In the first to third, fifth, and eighth embodiments, the first lens component G11 has a biconcave shape. In the fourth, sixth, and seventh embodiments, the surface on the object side of the first lens component G11 is convex and formed in a meniscus shape.

The first lens unit L1 plays a role of a compensator in zooming. By configuring the first lens unit L1 as described above, correction of aberrations is realized by a small number of lenses in the entire zoom area and, in particular, variation in chromatic aberration during zooming is suppressed.

Further, the aspherical shape on the image side of the second lens component G12 is an aspherical shape in which the negative refractive power weakens from the lens center to the lens periphery. Therefore, astigmatism and distortion are corrected with good balance. In the first and fourth embodiments, the surface on the image side of the third lens component G13 is also formed in an aspherical shape to share an aberration correction amount and satisfactorily correct astigmatism and distortion.

The second lens unit L2 is configured as described below in the stated order from the object side to the image side.

In each of the embodiments, the second lens unit L2 is configured to have at least one positive lens G21 and at least one negative lens G22.

In the first embodiment, the second lens unit L2 includes, in the stated order from the object side to the image side, the positive lens G21 of a biconvex shape and the negative lens G22 of a meniscus shape with a convex surface thereof directed to the object side.

In the second and third embodiments, the second lens unit L2 includes, in the stated order from the object side to the image side, the positive lens G21 of a biconvex shape, the negative lens G22 of a meniscus shape with a convex surface thereof directed to the object side, and a positive lens G23 of a meniscus shape with a convex surface thereof directed to the image side.

In the fourth embodiment, the second lens unit L2 includes, in the stated order from the object side to the image side, the positive lens G21 of a biconvex shape, the negative lens G22 of a biconvex shape, and a positive lens G23 of a biconvex shape.

The three-group zoom lens system according to the fifth and sixth embodiments includes, in the stated order from the object side to the image side, a cemented lens formed by joining the positive lens G21 and the negative lens G22 and a cemented lens formed by joining the negative lens G23 and a positive lens G24.

The three-group zoom lens system according to the seventh and eighth embodiments includes, in the stated order from the object side to the image side, the positive lens G21 of a meniscus shape with a convex surface thereof directed to the object side, the negative lens G22 of a meniscus shape with a convex surface thereof directed to the object side, and the positive lens G23 of a biconvex shape.

The second lens unit L2 is a lens unit that performs main zooming. Aberration variation involved in the zooming tends to occur, and hence the second lens unit L2 is configured to reduce aberration variation during zooming.

In the positive lens G21 arranged on the most object side in the second lens unit L2, the surface on the object side is formed in a convex shape to prevent off axial aberrations from often occurring even if an off ray is substantially refracted. The surface on the object side of the positive lens G21 is formed in a convex shape in order to suppress an occurrence amount of spherical aberration with respect to an axial raye-mitted from the first lens unit L1 in a diverging state. Further, because the surface on the most object side of the second lens unit L2 is a lens surface on which the axial ray is the highest, the lens surface is formed in an aspherical shape to correct spherical aberration and coma aberration.

In the first embodiment, the second lens unit L2 includes two lenses to attain a reduction in size of the second lens unit L2 while satisfactorily correcting chromatic aberration. Further, the surfaces on the image side of the positive lens G21 and the negative lens G22 are also formed in an aspherical shape to share an aberration correction amount. Even if the number of lenses is small, variation of spherical aberration and coma aberration in zooming is satisfactorily corrected.

In the second to eighth embodiments, the second lens unit L2 is formed in a relatively symmetrical lens configuration to reduce aberration variation during zooming.

Further, the surfaces on the image side of the positive lens G21 and the negative lens G22 in the second and third embodiments, the surface on the image side of the positive lens G23 in the fourth embodiment, and the surface on the image side of the positive lens G21 in the seventh and eighth embodiments are formed in an aspherical shape to share an aberration correction amount of spherical aberration, and satisfactorily correct coma aberration.

By adopting the lens configuration described above, occurrence of aberration from the second lens unit L2 is reduced in the entire zoom area.

In the three-group zoom lens system according to the fifth to eighth embodiments, the third lens unit L3 includes one positive lens G31.

The third lens unit L3 shares combined refractive power of the first lens unit L1 and the second lens unit L2, and is given a role of a field lens. Consequently, in particular, on an image side necessary in a camera employing a solid state image pickup element, telecentric imaging is performed.

The surface on the object side of the positive lens G31 in the fifth embodiment and the surface on the image side of the positive lens G31 in the seventh and eighth embodiments are formed in an aspherical shape to satisfactorily correct astigmatism at a wide angle end.

As described above, in each of the embodiments, in the negative-lead zoom lens system in which the lens unit having negative refractive power is provided closer to the object side, a reduction in size of the entire zoom lens system is realized by configuring the lens units as described above.

In the embodiments, distortion among the aberrations may be corrected by using a publicly-known electric aberration correcting method.

Numerical embodiments of the embodiments are described below.

In each of the numerical embodiments, "i" indicates order of a surface from the object side, "ri" indicates a curvature radius of a lens surface, "di" indicates an interval between an ith surface and a (i+1)th surface, and ndi and vdi indicate a refractive index and an Abbe number with reference to the d-line, respectively.

In an aspherical shape, a traveling direction of light is set as positive and "x" represents displacement from a surface vertex in an optical axis direction. "h" represents the height from an optical axis in a direction perpendicular to the optical axis, and R represents a paraxial curvature radius. When "k" represents a conic constant and B, D, C, and E represent aspherical coefficients, the displacement "x" is represented by the following formula:

$$X=(h^2/R)/[1+\{1-(1+k)*(h/R)^2\}^{1/2}]+B*h^4+C*h^6+D*h^8+E*h^{10}$$

"E±XX" in the aspherical coefficients means "×10$^{\pm XX}$".

In the first to third and fifth to eighth embodiments, two surfaces on the most image side are glass blocks such as face plates.

A relation between the conditional expressions and the numerical embodiments is shown in Table 1.

(First Numerical Embodiment)

f = 6.69~12.81~18.93 Fno = 3.28~4.43~5.60 ω = 30.1°~16.9°~11.6°

| Surface Number | r | d | nd | vd | Effective Diameter |
|---|---|---|---|---|---|
| 1 | −169.120 | 0.60 | 1.97000 | 40.0 | 8.96 |
| 2 | 8.497 | 0.10 | 1.62524 | 25.2 | 8.06 |
| 3* | 6.125 | 1.80 | | | 7.87 |
| 4 | 14.069 | 1.40 | 1.92110 | 22.4 | 8.05 |
| 5* | 201.595 | (Variable) | | | 7.89 |
| 6(Stop) | ∞ | 0.00 | | | 4.94 |
| 7* | 4.020 | 2.30 | 1.56907 | 71.3 | 5.07 |
| 8 | −55.576 | 0.30 | | | 4.55 |
| 9* | 9.360 | 0.60 | 1.84666 | 23.8 | 4.15 |
| 10* | 4.768 | (Variable) | | | 3.68 |
| 11 | ∞ | 1.94 | 1.51633 | 64.1 | 10.00 |
| 12 | ∞ | | | | 10.00 |

| | Focal Length | | |
|---|---|---|---|
| Variable Interval | 6.69 | 12.81 | 18.93 |
| D5 | 15.26 | 5.01 | 1.38 |
| D10 | 9.66 | 14.23 | 18.85 |

Aspherical Coefficient

| | k | B | C | D | E |
|---|---|---|---|---|---|
| R3 | −7.16673E−01 | 4.07775E−05 | 2.59249E−05 | −1.38712E−06 | 1.84231E−08 |
| R5 | 0.00000E+00 | −1.19853E−04 | −6.04957E−06 | 2.26521E−07 | −1.83911E−09 |
| R7 | −2.39726E+00 | 3.85347E−03 | −6.23301E−05 | 3.82173E−06 | 2.62744E−08 |
| R9 | 0.00000E+00 | 3.57545E−03 | −4.66137E−04 | 3.20830E−05 | −1.95749E−06 |
| R10 | 0.00000E+00 | 6.73085E−03 | −2.70630E−04 | 3.80796E−05 | 1.15559E−06 |

(Second Numerical Embodiment)

f = 6.70~12.81~18.93 Fno = 3.00~4.11~5.23 ω = 30.1°~16.9°~11.6°

| Surface Number | r | d | nd | vd | Effective Diameter |
|---|---|---|---|---|---|
| 1 | −162.216 | 0.60 | 2.09500 | 29.4 | 9.22 |
| 2 | 8.626 | 0.10 | 1.62524 | 25.2 | 8.33 |
| 3* | 8.083 | 1.72 | | | 8.29 |
| 4 | 13.245 | 1.40 | 2.14352 | 17.8 | 8.38 |
| 5 | 38.728 | (Variable) | | | 8.09 |
| 6(Stop) | ∞ | 0.00 | | | 5.11 |
| 7* | 4.751 | 1.80 | 1.77250 | 49.6 | 5.23 |
| 8* | −38.637 | 0.40 | | | 4.76 |
| 9 | 26.782 | 0.60 | 1.84666 | 23.8 | 4.31 |
| 10* | 4.769 | 0.69 | | | 3.82 |
| 11 | −8.660 | 0.80 | 1.48749 | 70.2 | 3.81 |
| 12 | −5.494 | (Variable) | | | 3.82 |
| 13 | ∞ | 1.94 | 1.51633 | 64.1 | 10.00 |
| 14 | ∞ | | | | 10.00 |

-continued (Second Numerical Embodiment)

| Variable Interval | Focal Length | | |
|---|---|---|---|
| | 6.70 | 12.81 | 18.93 |
| D5 | 14.72 | 4.22 | 0.50 |
| D12 | 8.72 | 13.07 | 17.46 |

Aspherical Coefficient

| | k | B | C | D | E |
|---|---|---|---|---|---|
| R3 | −1.10339E+00 | 3.13475E−05 | 8.29810E−06 | −4.76973E−07 | 9.19698E−09 |
| R7 | −2.78990E+00 | 3.11427E−03 | −2.73659E−05 | 1.89645E−06 | 1.54871E−07 |
| R8 | 0.00000E+00 | 1.29317E−03 | | | |
| R10 | 0.00000E+00 | 8.14252E−04 | 1.49397E−04 | −1.38296E−05 | 3.09953E−06 |

(Third Numerical Embodiment)

f = 6.72~12.88~19.06 Fno = 3.08~4.20~5.32 ω = 30.0°~16.8°~11.5°

| Surface Number | r | d | nd | vd | Effective Diameter |
|---|---|---|---|---|---|
| 1 | −352.917 | 0.60 | 2.20000 | 35.0 | 9.19 |
| 2 | 9.789 | 0.10 | 1.62524 | 25.2 | 8.40 |
| 3* | 7.373 | 1.40 | | | 8.28 |
| 4 | 11.856 | 1.20 | 2.00170 | 20.6 | 8.42 |
| 5 | 52.776 | (Variable) | | | 8.24 |
| 6(Stop) | ∞ | 0.00 | | | 4.95 |
| 7* | 4.867 | 1.80 | 1.77250 | 49.6 | 5.06 |
| 8* | −21.188 | 0.30 | | | 4.61 |
| 9 | 64.929 | 0.50 | 1.76182 | 26.5 | 4.28 |
| 10 | 4.353 | 0.70 | | | 3.84 |
| 11* | −10.849 | 1.00 | 1.48749 | 70.2 | 3.83 |
| 12 | −5.610 | (Variable) | | | 3.85 |
| 13 | ∞ | 1.94 | 1.51633 | 64.1 | 10.00 |
| 14 | ∞ | | | | 10.00 |

| Variable Interval | Focal Length | | |
|---|---|---|---|
| | 6.72 | 12.88 | 19.06 |
| D5 | 14.94 | 4.27 | 0.5 |
| D12 | 9.11 | 13.48 | 17.89 |

Aspherical Coefficient

| | k | B | C | D | E |
|---|---|---|---|---|---|
| R3 | −8.37588E−01 | 7.46234E−06 | 6.01071E−06 | −3.71918E−07 | 7.30970E−09 |
| R7 | −2.67670E+00 | 2.58821E−03 | −7.91787E−06 | 9.28240E−07 | 2.22890E−07 |
| R8 | 0.00000E+00 | 1.94528E−03 | | | |
| R11 | 0.00000E+00 | 9.32171E−04 | −4.98750E−05 | 1.65547E−05 | −3.34410E−06 |

(Fourth Numerical Embodiment)

f = 36.1~54.15~70.39 Fno = 3.89~4.90~5.85 ω = 30.9°~21.8°~17.1°

| Surface Number | r | d | nd | vd | Effective Diameter |
|---|---|---|---|---|---|
| 1 | 4280.532 | 1.30 | 1.97000 | 40.0 | 26.02 |
| 2 | 21.673 | 0.10 | 1.62524 | 25.2 | 23.36 |
| 3* | 18.510 | 5.03 | | | 23.25 |
| 4 | 29.704 | 2.60 | 1.92110 | 22.4 | 23.19 |
| 5* | 92.960 | (Variable) | | | 22.77 |
| 6(Stop) | ∞ | 0.50 | | | 17.07 |
| 7 | 17.964 | 3.80 | 1.69680 | 55.5 | 17.68 |

-continued (Fourth Numerical Embodiment)

| | | | | | |
|---|---|---|---|---|---|
| 8 | −55.175 | 3.00 | | | 17.43 |
| 9 | −30.992 | 5.00 | 1.84666 | 23.8 | 15.03 |
| 10 | 89.999 | 5.14 | | | 14.05 |
| 11 | 110.771 | 2.80 | 1.58144 | 40.8 | 13.42 |
| 12* | −131.839 | (Variable) | | | 13.33 |

Focal Length

| Variable Interval | 36.1 | 54.15 | 70.39 |
|---|---|---|---|
| D5 | 24.0 | 9.99 | 3.52 |

Aspherical Coefficient

| | k | B | C | D | E |
|---|---|---|---|---|---|
| R3 | −1.33867E−01 | −2.02846E−05 | 2.11427E−08 | −1.51817E−10 | −1.98018E−12 |
| R5 | 0.00000E+00 | 4.13664E−06 | −1.24880E−08 | 1.88973E−11 | 1.22899E−12 |
| R12 | 0.00000E+00 | 5.35064E−05 | −2.09562E−07 | 1.25943E−08 | −1.25794E−10 |

(Fifth Numerical Embodiment)

f = 4.75~10.69~16.63 Fno = 2.8~4.2~5.6 ω = 37.0°~18.5°~12.1°

| Surface Number | r | d | nd | vd | Effective Diameter |
|---|---|---|---|---|---|
| 1 | −373.535 | 0.60 | 1.97000 | 40.0 | 11.36 |
| 2 | 7.056 | 0.10 | 1.62524 | 25.2 | 9.66 |
| 3* | 4.665 | 1.43 | | | 9.45 |
| 4 | 9.938 | 1.60 | 2.00170 | 20.6 | 9.60 |
| 5 | 40.564 | (Variable) | | | 9.37 |
| 6(Stop) | ∞ | 0.70 | | | 4.73 |
| 7* | 4.938 | 1.80 | 1.77250 | 49.6 | 4.94 |
| 8 | 6.332 | 0.80 | 1.76182 | 26.5 | 4.36 |
| 9 | 4.630 | 0.72 | | | 4.09 |
| 10 | 10.437 | 0.50 | 1.84666 | 23.8 | 4.18 |
| 11 | 5.549 | 1.80 | 1.60311 | 60.6 | 4.19 |
| 12 | −12.868 | (Variable) | | | 4.45 |
| 13* | 24.188 | 1.20 | 1.58313 | 59.4 | 7.49 |
| 14 | −62.057 | (Variable) | | | 7.49 |
| 15 | ∞ | 0.90 | 1.51633 | 64.1 | 10.00 |
| 16 | ∞ | | | | 10.00 |

Focal Length

| Variable Interval | 4.75 | 10.69 | 16.63 |
|---|---|---|---|
| D5 | 16.2 | 5.11 | 2.00 |
| D12 | 4.67 | 13.11 | 21.35 |
| D14 | 3.75 | 3.24 | 2.50 |

Aspherical Coefficient

| | k | B | C | D | E | F |
|---|---|---|---|---|---|---|
| R3 | −1.59080E+00 | 4.49503E−04 | 2.16895E−06 | −5.71946E−07 | 1.46165E−08 | −1.37187E−10 |
| R7 | −2.22998E−01 | −2.36821E−04 | −1.10436E−06 | −1.36887E−07 | −3.77549E−09 | |
| R13 | 0.00000E+00 | −2.99426E−04 | 1.98106E−05 | −1.40251E−06 | 3.63150E−08 | |

(Sixth Numerical Embodiment)

f = 5.87~11.24~16.60 Fno = 2.80~3.94~5.10 ω = 31.3°~17.6°~12.1

| Surface Number | r | d | nd | vd | Effective Diameter |
|---|---|---|---|---|---|
| 1 | 39.790 | 0.60 | 2.00000 | 33.0 | 11.66 |
| 2 | 7.604 | 0.10 | 1.63555 | 22.7 | 10.12 |
| 3* | 5.115 | 2.09 | | | 9.81 |
| 4 | 10.509 | 1.60 | 2.14352 | 17.8 | 10.14 |
| 5 | 21.943 | (Variable) | | | 9.78 |
| 6(Stop) | ∞ | 0.70 | | | 5.24 |
| 7* | 4.985 | 1.80 | 1.80610 | 40.4 | 5.47 |
| 8 | 6.213 | 0.80 | 1.64769 | 33.8 | 4.81 |
| 9 | 4.620 | 0.72 | | | 4.45 |
| 10 | 11.680 | 0.50 | 1.84666 | 23.8 | 4.45 |
| 11 | 4.943 | 1.80 | 1.60311 | 60.6 | 4.32 |
| 12 | −13.497 | (Variable) | | | 4.27 |
| 13 | 13.078 | 1.20 | 1.48749 | 70.2 | 7.72 |
| 14 | 119.942 | (Variable) | | | 7.66 |
| 15 | ∞ | 0.90 | 1.51633 | 64.1 | 10.00 |
| 16 | ∞ | | | | 10.00 |

| | Focal Length | | |
|---|---|---|---|
| Variable Interval | 5.87 | 11.24 | 16.6 |
| D5 | 16.43 | 5.84 | 2.18 |
| D12 | 6.34 | 12.92 | 19.55 |
| D14 | 3.36 | 3.06 | 2.50 |

Aspherical Coefficient

| | k | B | C | D | E | F |
|---|---|---|---|---|---|---|
| R3 | −1.56255E+00 | 5.93422E−04 | 3.51052E−06 | −5.25484E−07 | 1.33416E−08 | −1.13782E−10 |
| R7 | −2.26586E−01 | −1.75339E−04 | 1.85834E−06 | −5.23565E−07 | 1.91638E−08 | |

(Seventh Numerical Embodiment)

f = 6.00~10.80~15.60 Fno = 3.0~4.16~5.27 ω = 30.8°~18.3°~12.3

| Surface Number | r | d | nd | vd | Effective Diameter |
|---|---|---|---|---|---|
| 1 | 48.563 | 0.60 | 1.85000 | 53.0 | 9.04 |
| 2 | 6.008 | 0.10 | 1.52421 | 51.4 | 7.77 |
| 3* | 4.361 | 1.26 | | | 7.56 |
| 4 | 7.287 | 1.20 | 2.09500 | 29.4 | 7.66 |
| 5 | 12.863 | (Variable) | | | 7.31 |
| 6(Stop) | ∞ | 0.60 | | | 4.10 |
| 7* | 4.005 | 1.60 | 1.77250 | 49.6 | 4.30 |
| 8* | 27.093 | 0.15 | | | 3.79 |
| 9 | 43.911 | 0.50 | 1.74000 | 28.3 | 3.73 |
| 10 | 3.785 | 0.35 | | | 3.56 |
| 11 | 14.386 | 1.20 | 1.58913 | 61.2 | 3.57 |
| 12 | −13.298 | (Variable) | | | 3.80 |
| 13 | 28.512 | 1.40 | 1.48749 | 70.2 | 7.39 |
| 14* | −18.012 | (Variable) | | | 7.43 |
| 15 | ∞ | 1.40 | 1.51633 | 64.1 | 10.00 |
| 16 | ∞ | | | | 10.00 |

| | Focal Length | | |
|---|---|---|---|
| Variable Interval | 6.00 | 10.80 | 15.60 |
| D5 | 11.22 | 4.71 | 2.00 |
| D12 | 4.20 | 10.75 | 16.14 |
| D14 | 4.13 | 3.04 | 2.50 |

-continued (Seventh Numerical Embodiment)

Aspherical Coefficient

| | k | B | C | D | E |
|---|---|---|---|---|---|
| R3 | −1.56480E+00 | 1.14632E−03 | 4.44912E−06 | −7.40753E−07 | 1.66105E−08 |
| R7 | −5.17415E−01 | 6.79331E−04 | 2.47606E−04 | −3.65376E−05 | 6.56468E−06 |
| R8 | 0.00000E+00 | 1.05008E−03 | 3.70465E−04 | −6.78554E−05 | 1.42412E−05 |
| R14 | 0.00000E+00 | 6.31105E−04 | −5.39984E−05 | 3.67344E−06 | −9.78687E−08 |

(Eighth Numerical Embodiment)

f = 5.10~8.42~11.73  Fno = 3.0~3.94~4.81  ω = 35.0°~23.0°~11.7

| Surface Number | r | d | nd | νd | Effective Diameter |
|---|---|---|---|---|---|
| 1 | −2950.545 | 0.60 | 1.77000 | 73.0 | 9.18 |
| 2 | 4.778 | 0.10 | 1.52421 | 51.4 | 7.48 |
| 3* | 3.475 | 1.41 | | | 7.39 |
| 4 | 7.417 | 1.40 | 1.88300 | 40.8 | 7.53 |
| 5 | 25.944 | (Variable) | | | 7.27 |
| 6(Stop) | ∞ | 0.60 | | | 3.89 |
| 7* | 4.526 | 1.60 | 1.77250 | 49.6 | 4.07 |
| 8* | 14.311 | 0.60 | | | 3.61 |
| 9 | 29.578 | 0.60 | 1.80518 | 25.4 | 3.44 |
| 10 | 5.049 | 0.30 | | | 3.38 |
| 11 | 12.942 | 1.40 | 1.48749 | 70.2 | 3.46 |
| 12 | −7.313 | (Variable) | | | 3.81 |
| 13 | 15.623 | 1.20 | 1.58913 | 61.2 | 7.37 |
| 14* | −72.651 | (Variable) | | | 7.34 |
| 15 | ∞ | 1.40 | 1.51633 | 64.1 | 10.00 |
| 16 | ∞ | | | | 10.00 |

Focal Length

| Variable Interval | 5.10 | 8.42 | 11.73 |
|---|---|---|---|
| D5 | 10.07 | 4.61 | 2.00 |
| D12 | 4.79 | 9.85 | 14.01 |
| D14 | 3.35 | 2.63 | 2.50 |

Aspherical Coefficient

| | k | B | C | D | E |
|---|---|---|---|---|---|
| R3 | −2.00409E+00 | 2.69806E−03 | −1.02346E−04 | 2.41421E−06 | −4.66519E−08 |
| R7 | −4.58425E−01 | 8.24507E−04 | 1.27715E−04 | −5.75064E−06 | 1.81820E−06 |
| R8 | 0.00000E+00 | 1.83935E−03 | 1.97715E−04 | −9.07117E−06 | 4.06484E−06 |
| R14 | 0.00000E+00 | 4.70814E−04 | −3.34966E−05 | 2.28528E−06 | −6.06088E−08 |

TABLE 1

| Conditional Expression | Lower Limit | Upper Limit | First Embodiment | Second Embodiment | Third Embodiment | Fourth Embodiment | Fifth Embodiment | Sixth Embodiment | Seventh Embodiment | Eighth Embodiment |
|---|---|---|---|---|---|---|---|---|---|---|
| (1) | 2.45 | 3.00 | 2.50 | 2.51 | 2.68 | 2.50 | 2.50 | 2.46 | 2.49 | 2.52 |
| (2) | 5 | 80 | 40.0 | 29.4 | 35.0 | 40.0 | 40.0 | 33.0 | 53.0 | 73.0 |
| (3) | 2.0 | 3.5 | 2.92 | 2.86 | 3.11 | 3.05 | 2.91 | 2.85 | 2.95 | 3.06 |
| (4) | 5.35 | 10.0 | 5.58 | 5.99 | 6.47 | 5.89 | 5.58 | 5.61 | 5.55 | 5.41 |
| (5) | 2.0 | 100.0 | 5.33 | 32.98 | 7.25 | 5.69 | 4.71 | 4.25 | 5.16 | 4.89 |
| (6) | 1.0 | 3.0 | 2.08 | 2.17 | 2.18 | 1.19 | 2.33 | 2.35 | 2.15 | 2.07 |
| (7) | 0.5 | 2.5 | 1.54 | 1.52 | 1.53 | 0.98 | 2.39 | 2.11 | 1.72 | 1.93 |

An example of a digital still camera (optical apparatus) in which the zoom lens system according to the present invention is used as a photographing optical system is described below with reference to FIG. 33.

In FIG. 33, reference numeral 20 denotes a camera main body and reference numeral 21 denotes a photographing optical system configured by the zoom lens system according to the present invention. Reference numeral 22 denotes a solid state image pickup element (photoelectric conversion element) such as a CCD sensor or a CMOS sensor that is incorporated in the camera main body 20 and receives light of a subject image formed by the zoom lens system 21.

Reference numeral 23 denotes a memory that records information corresponding to the subject image photoelectrically converted by the solid state image pickup element 22. Reference numeral 24 denotes a finder including a liquid crystal display panel and used for observing the subject image formed on the solid state image pickup element 22.

An optical apparatus that is small and has high optical performance is realized by applying the zoom lens system according to the present invention to the optical apparatus such as a digital still camera in this way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-145622 filed on Jun. 3, 2008, which is hereby incorporated by reference herein.

What is claimed is:

1. A zoom lens system, comprising:
   a first lens unit having negative optical power,
   the first lens unit comprising: a first lens component having negative optical power; a second lens component joined to a lens surface of the first lens component; and a third lens component having positive optical power; and
   a second lens unit having positive optical power,
   the first lens unit and the second lens unit being arranged in the stated order from an object side to an image side, wherein:
   an interval between the first lens unit and the second lens unit changes in zooming;
   the second lens component is made of a material different from a material of the first lens component and is formed in an aspherical shape in a surface on a image side of the second lens component; and
   when a refractive index with respect to a d-line of the material of the first lens component and an Abbe number thereof are represented as $Nd1n$ and $vd1n$, respectively, the following condition is satisfied:

$$2.45 < Nd1n - (9.3 \times 10^{-5} \times vd1n^2 - 1.7 \times 10^{-2} \times vd1n) < 3.00$$

$$5.0 < vd1n < 80.0.$$

2. A zoom lens system according to claim 1, wherein, when optical power of the first lens unit is represented as $\Phi 1$, optical power of an ith lens component is represented as $\Phi 1i$, a refractive index on a d-line of a material of the ith lens component is represented as $N1i$, and $$\Sigma|\phi 1i/\Phi 1| = (|\phi 11| + |\phi 12| + |\phi 13|)/\Phi 1$$

$$\Sigma|N1i \times \phi 1i/\Phi 1| = (N11 \times |\phi 11| + N12 \times |\phi 12| + N13 \times |\phi 13|)/\Phi 1,$$

the following condition is satisfied:

$$2.0 < \Sigma|\phi 1i/\Phi 1| < 3.5$$

$$5.35 < \Sigma|N1i \times \phi 1i/\Phi 1| < 10.00.$$

3. A zoom lens system according to claim 1, wherein, when a focal length of the second lens component is represented as $f1r$ and a focal length of an entire system at a wide angle end is represented as $fw$, the following condition is satisfied:

$$2.0 < |f1r/fw| < 100.0.$$

4. A zoom lens system according to claim 1, wherein, when a focal length of the first lens unit is represented as $f1$ and a focal length of an entire system at a wide angle end is represented as $fw$, the following condition is satisfied:

$$1.0 < |f1/fw| < 3.0.$$

5. A zoom lens system according to claim 1, wherein, when a focal length of the second lens unit is represented as $f2$ and a focal length of an entire system at a wide angle end is represented as $fw$, the following condition is satisfied:

$$0.5 < f2/fw < 2.5.$$

6. A zoom lens system according to claim 1, further comprising a third lens unit having positive optical power, which is arranged on an image side of the second lens unit,
   wherein an interval between the second lens unit and the third lens unit changes in zooming.

7. A zoom lens system according to claim 1, wherein the first lens component, the second lens component, and the third lens component are arranged in the stated order from the object side to the image side.

8. A camera, comprising:
   the zoom lens system according to claim 1; and
   a solid state image pickup element that receives an image formed by the zoom lens system.

* * * * *